United States Patent [19]
Niki et al.

[11] Patent Number: 5,315,446
[45] Date of Patent: May 24, 1994

[54] RECORDING AND REPRODUCING METHOD AND APPARATUS FOR A DIGITAL AUDIO SIGNAL AND A REVERSED BIT ORDER DIGITAL VIDEO

[75] Inventors: Mamoru Niki, Koshigaya; Yoshiaki Hosaka, Tokyo; Takao Mogi, Utsunomiya; Haruo Saito, Kuki, all of Japan

[73] Assignee: AIWA Co., Ltd., Tokyo, Japan

[21] Appl. No.: 4,195

[22] Filed: Jan. 13, 1993

Related U.S. Application Data

[63] Continuation of Ser. No. 533,583, Jun. 5, 1990, abandoned.

[30] Foreign Application Priority Data

| Jun. 13, 1989 | [JP] | Japan | 1-151217 |
| Jun. 13, 1989 | [JP] | Japan | 1-151220 |
| Jun. 13, 1989 | [JP] | Japan | 1-151221 |
| Jun. 13, 1989 | [JP] | Japan | 1-151222 |
| Jun. 13, 1989 | [JP] | Japan | 1-151223 |

[51] Int. Cl.$^5$ .................. G11B 5/09; G11B 5/02
[52] U.S. Cl. ......................... 360/48; 360/32; 360/19.1
[58] Field of Search .......... 360/13, 19.1, 32, 34.1, 360/39, 64; 358/343

[56] References Cited

U.S. PATENT DOCUMENTS

| 3,610,819 | 10/1971 | Thompson | 360/34.1 |
| 3,641,265 | 2/1972 | Ganske | 360/34.1 |
| 4,507,688 | 3/1985 | Fujiki et al. | 360/13 |
| 4,531,153 | 7/1985 | Watanabe | 358/141 |
| 4,575,772 | 3/1986 | Shimada et al. | 360/19.1 |
| 4,669,002 | 5/1987 | Nishioka et al. | 360/64 |
| 4,849,833 | 7/1989 | Yoshimura et al. | 360/36.2 |
| 5,012,352 | 4/1991 | Yoshimura et al. | 358/343 |

FOREIGN PATENT DOCUMENTS

0253192 1/1988 European Pat. Off. .
0338812 10/1989 European Pat. Off. .
62-154374 12/1987 Japan .

OTHER PUBLICATIONS

"General Report of the DAT Conference" Mar. 1988, p. 45, Electronic Industries Association of Japan, Engineering Dept.
Patent Abstracts of Japan, vol. 12, No. 245 (P-729), Jul. 12, 1988 JP(A) 63-037868 (abstract).
Patent Abstracts of Japan, vol. 11, No. 389 (P-648), Dec. 19, 1987 JP(A) 62-154374 (abstract).
Patent Abstracts of Japan, vol. 11, No. 389 (P-648), Dec. 19, 1987 JP(A) 62-154302 (abstract).
Patent Abstracts of Japan, vol. 12, No. 72 (E-588), Mar. 5, 1988 JP(A) 62-213491 (abstract).
Patent Abstracts of Japan, vol. 10, No. 293 (E-443), Oct. 4, 1984 JP(A) 61-111066 (abstract).
Patent Abstracts of Japan, vol. 14, No. 419 (P-1103), Sep. 10, 1990 JP(A) 02-161661 (abstract).
Patent Abstracts of Japan, vol. 14, No. 419 (P-1103), Sep. 10, 1990 JP(A) 02-161660 (abstract).
Patent Abstracts of Japan, vol. 15, No. 095 (P-1176), Mar. 7, 1991 JP(A) 02-308476 (abstract).

*Primary Examiner*—Donald Hajec
*Assistant Examiner*—Won Tae C. Kim
*Attorney, Agent, or Firm*—Dellett and Walters

[57] ABSTRACT

A method can record or reproduce a digital audio signal and a digital video signal simultaneously. An N-bit (N: positive integer) digital audio signal is positioned at a higher bit side and an M-bit (M: positive integer) digital video signal is positioned at a lower bit side so as to form an (N+M)-bit digital signal which is recorded or reproduced in this condition. Since the digital video signal is positioned at the lower bit side, the digital video signal may not affect the reproduced audio signal even if the (N+M)-bit digital signal is processed as the digital audio signal in the reproducing process.

20 Claims, 25 Drawing Sheets

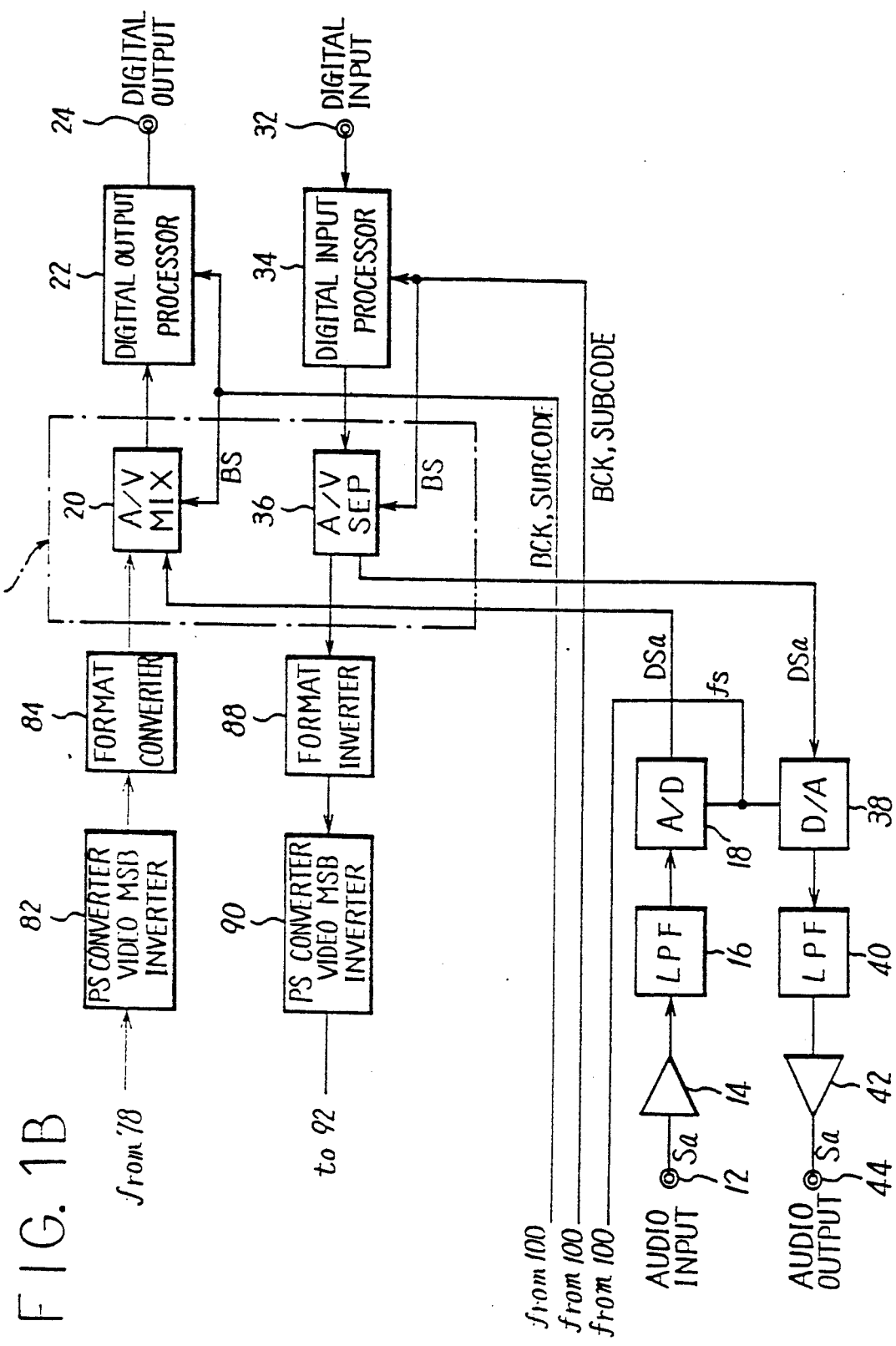

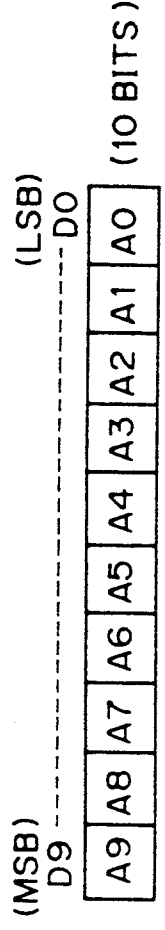
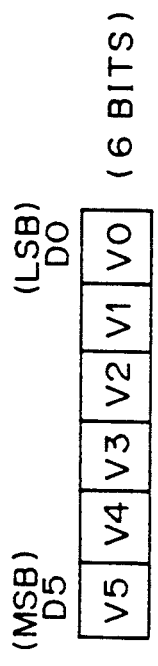
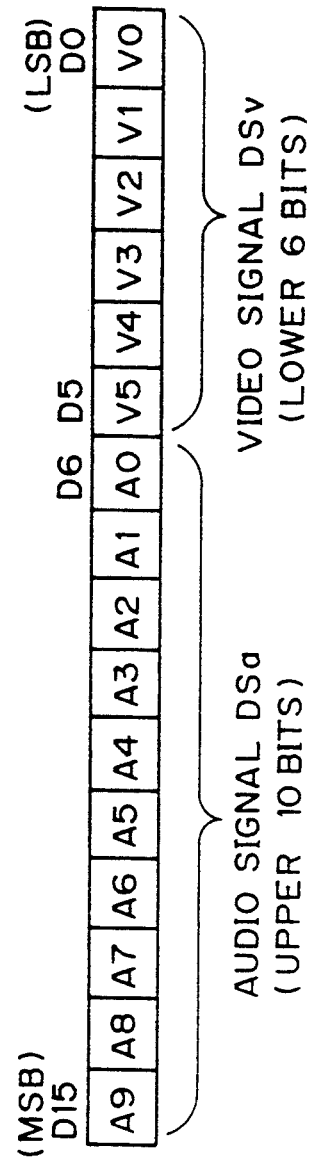
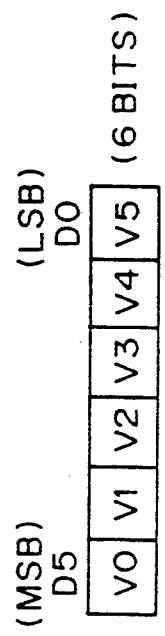
FIG. 2A DIGITAL AUDIO SIGNAL DSa
FIG. 2B DIGITAL VIDEO SIGNAL DSv
FIG. 2C DIGITAL SIGNAL DS
FIG. 2D DIGITAL VIDEO SIGNAL DSv

SIGNAL FORMAT

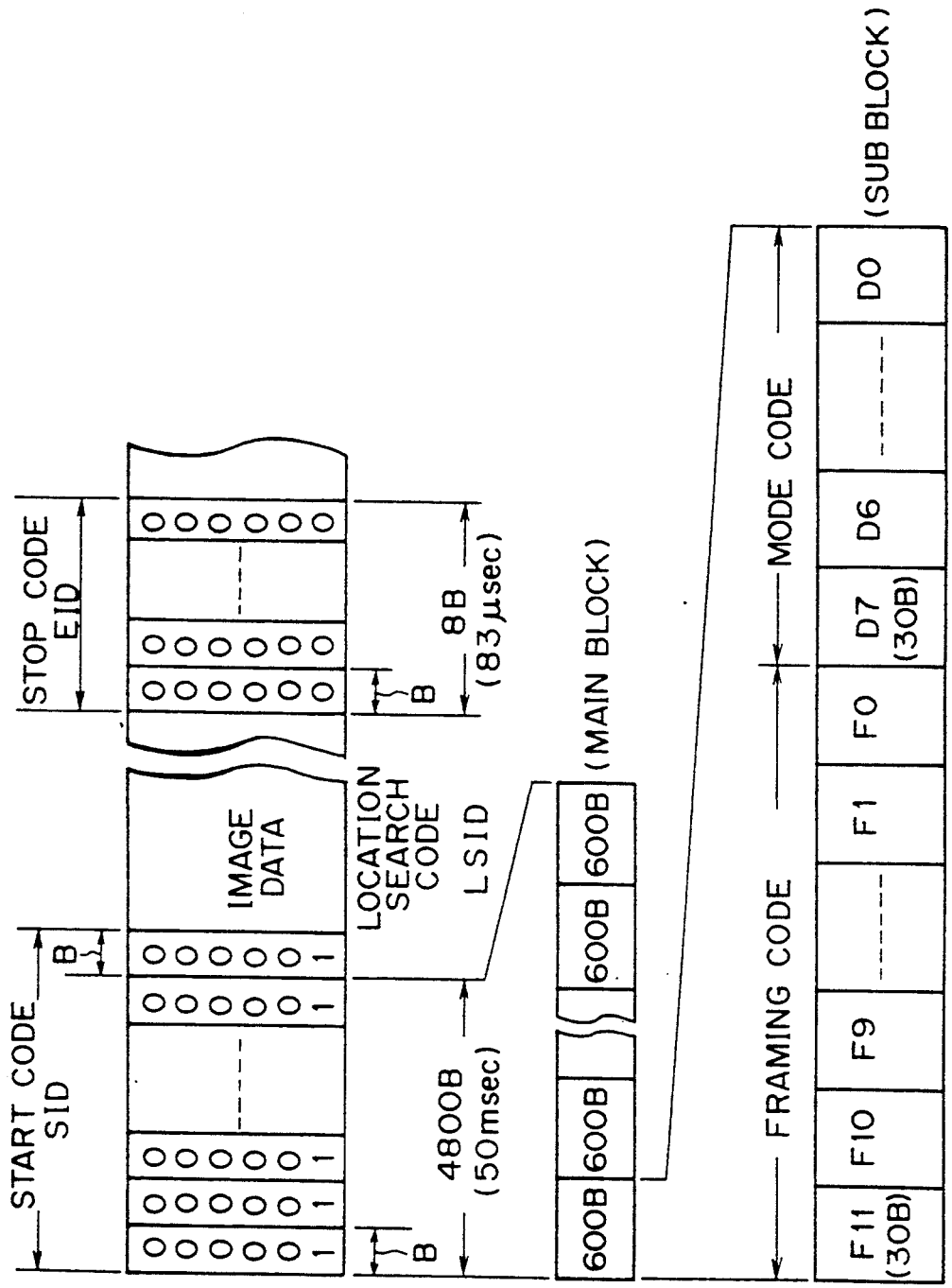

| D1 | D0 | MODE |
|---|---|---|
| 0 | 0 | COMPOSITE VIDEO |
| 0 | 1 | Y/C SIGNAL |
| 1 | 0 | R/G/B SIGNAL |
| 1 | 1 | — |

| D3 | D2 | MODE |
|---|---|---|
| 0 | 0 | VIDEO 6 BITS |
| 0 | 1 | VIDEO 8 BITS |
| 1 | 0 | — |
| 1 | 1 | SUPERIMPOSE |

|  | MSB | | | | | | LSB |
|---|---|---|---|---|---|---|---|
| ORIGINAL VIDEO DATA | V5 | V4 | V3 | V2 | V1 | V0 | |
| RECORDING WITH INVERTING MSB | $\overline{V5}$ | V4 | V3 | V2 | V1 | V0 | |
| REPRODUCING WITH INVERTING MSB | V5 | V4 | V3 | V2 | V1 | V0 | |
| REPRODUCED OUTPUT AT INTERMEDIATE STOP | 0 | 0 | 0 | 0 | 0 | 0 | |
| REPRODUCING WITH INVERTING MSB | 1 | 0 | 0 | 0 | 0 | 0 | |

FIG.7

FREQUENCY

FREQUENCY

FREQUENCY

FREQUENCY

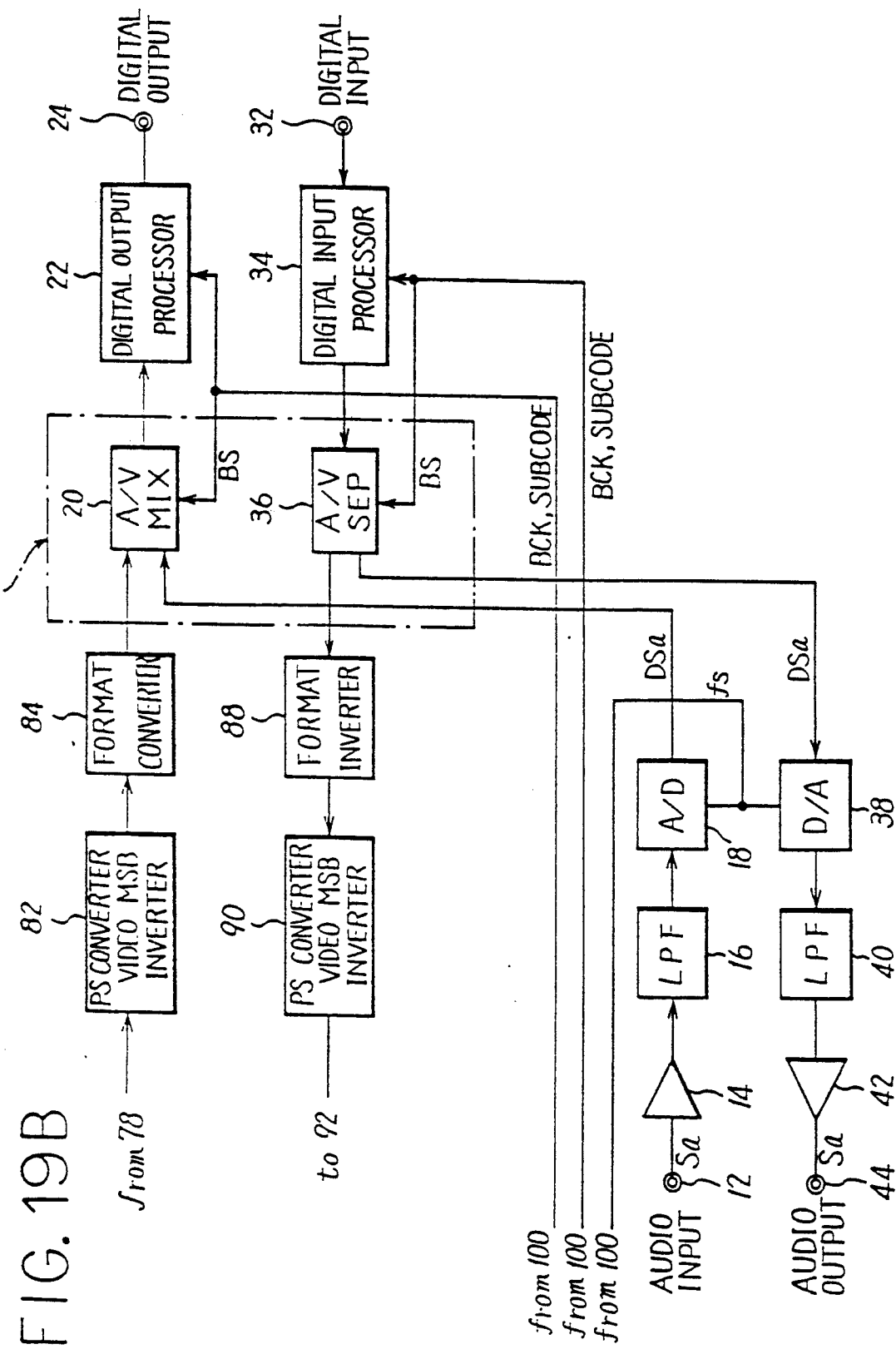

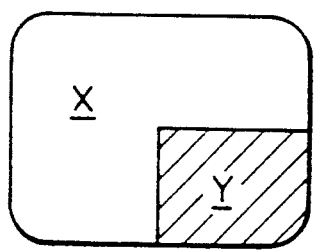 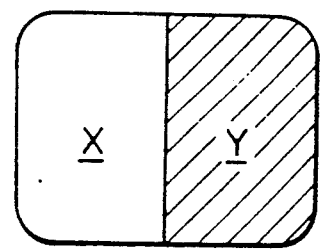
SUPERIMPOSE MODE
FIG. 20A
SUPERIMPOSE MODE
FIG. 20B

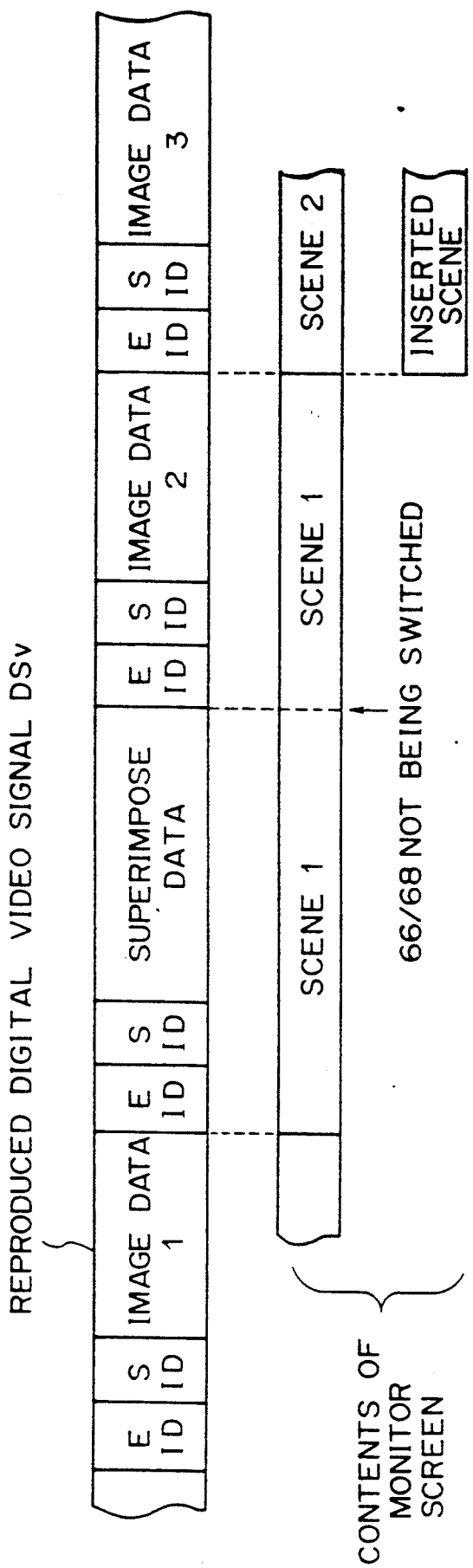
FIG.21 EXPLANATION OF SUPERIMPOSE

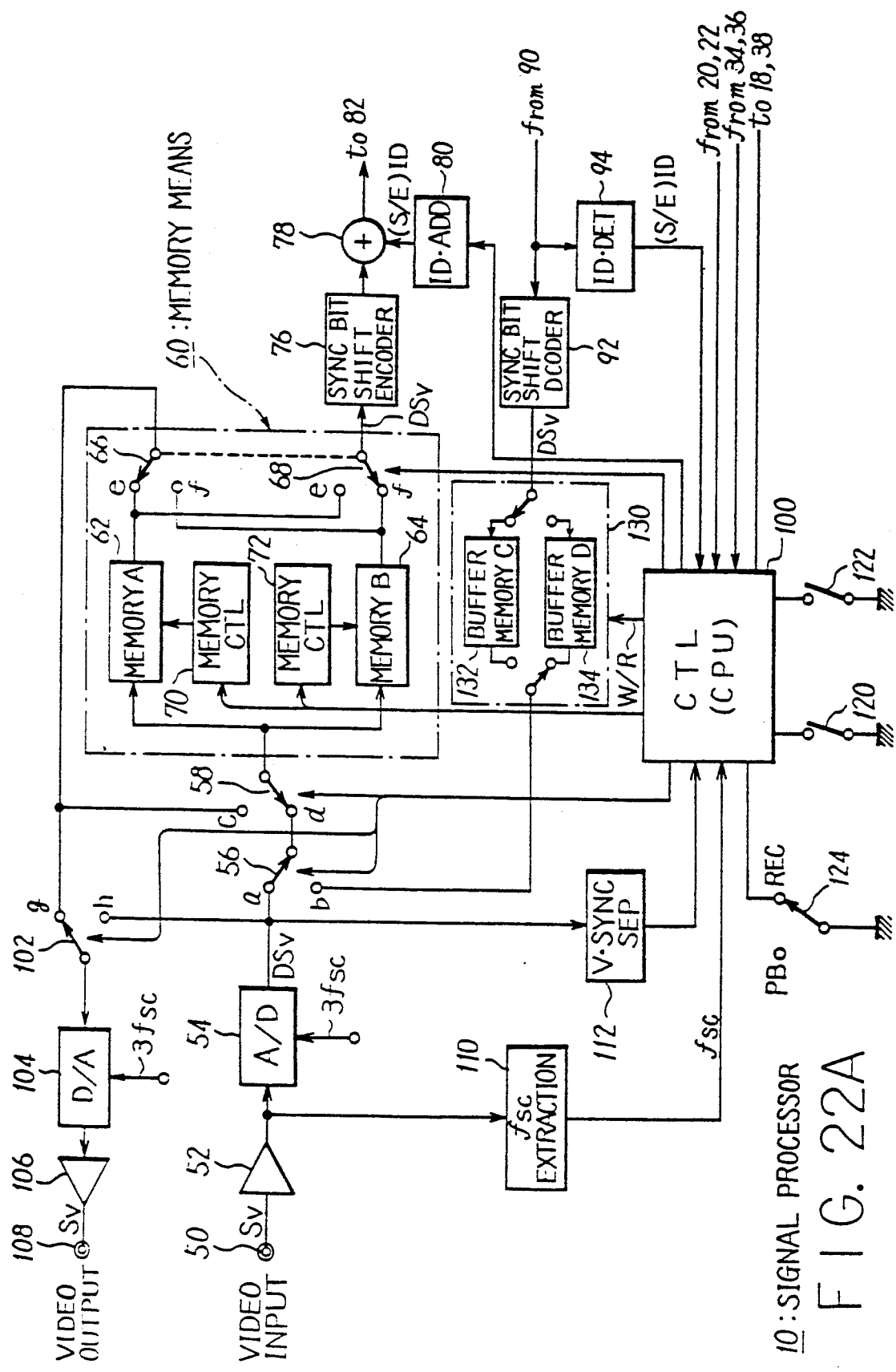

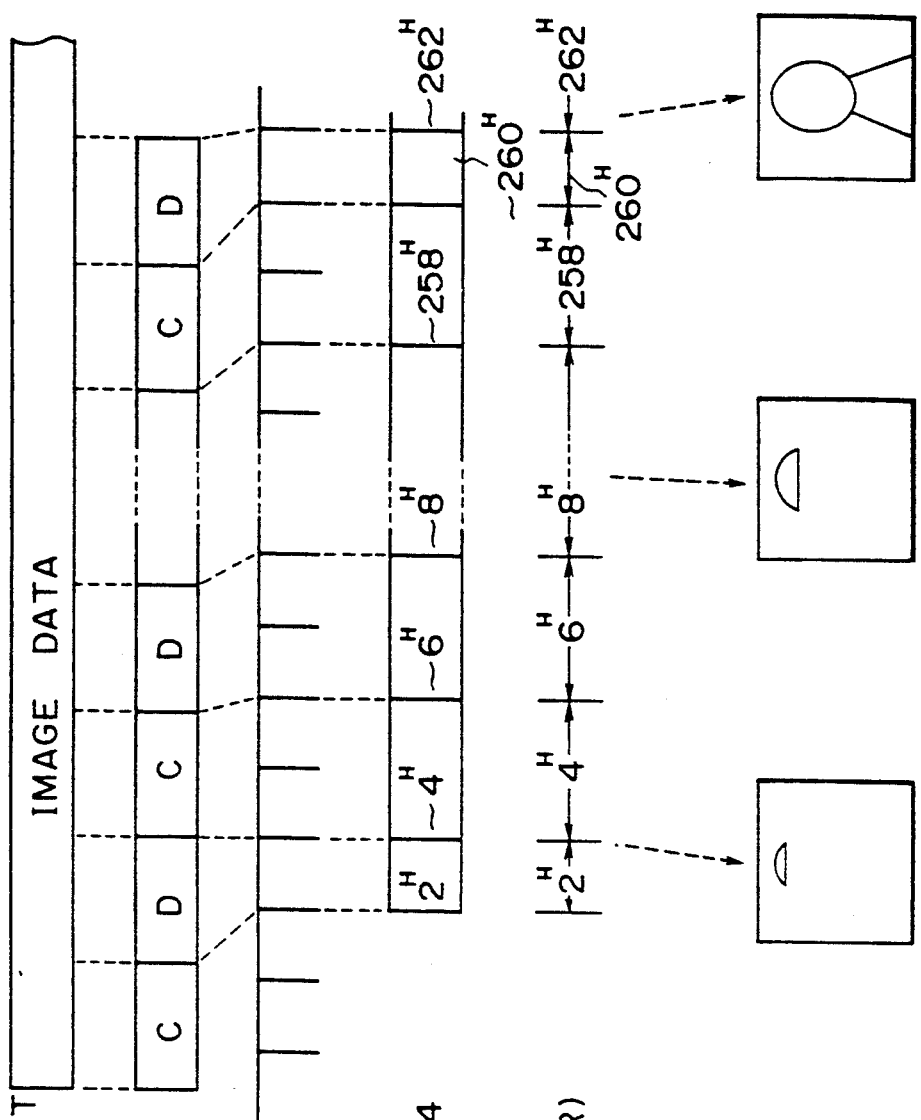

RECORDING AND REPRODUCING METHOD AND APPARATUS FOR A DIGITAL AUDIO SIGNAL AND A REVERSED BIT ORDER DIGITAL VIDEO

This is a continuation of application Ser. No. 07/533,583 filed Jun. 5, 1990 and now abandoned.

BACKGROUND OF THE INVENTION

The present invention relates to a method and an apparatus of recording and reproducing both a digital audio signal and a digital video signal simultaneously.

A current digital audio tape recorder (hereinafter refer to "DAT") is able to record and reproduce only an audio signal. However, it is very convenient to record and reproduce both the audio signal and another signal, such as a video signal of a static image, simultaneously.

In order to record and reproduce the video signal, for example, it can be considered to record the audio signal on odd tracks and the video signal on even tracks, i.e., to record each the signal on a signal channel. In addition, it may be possible to record both the signals in a format excluding the current audio format.

However, if the audio signal is recorded on one channel and the video signal is recorded on the other channel in the audio format of the DAT, the video signal is reproduced as the audio signal when not using a reproducing apparatus which can reproduce both the audio and video signals. When the video signal is reproduced by the DAT only having an audio signal reproducing apparatus function, the signal causes excess noise and it is hard to use the DAT.

When both the audio and video signals are recorded in a format excluding the current audio format, the current DAT cannot reproduce the audio signal.

What is desired is a method and an apparatus which can record and reproduce both a digital audio signal and a digital video signal simultaneously without having a bad influence on the audio signal reproducing operation of the current DAT.

SUMMARY OF THE INVENTION

According to an aspect of the present invention, (N+M)-bit digital signal (N,M: positive integers) is formed by an N-bit digital audio signal as higher bits and an M-bit digital video signal as lower bits. The digital signal is recorded and reproduced in a (N+M)-bits condition.

According to another aspect of the present invention, mixing means forms (N+M)-bit digital signal by mixing an N-bit digital audio signal as higher bits and an M-bit digital video signal as lower bits. Recording means records the (N+M)-bit digital signal from the mixing means on a recording medium.

According to a further aspect of the present invention, reproducing means reproduces (N+M)-bit digital signal from a recording medium, and the recording medium stores the (N+M)-bit digital signal consisting of an N-bit digital audio signal as higher bits and an M-bit digital video signal as lower bits. Separation means separates the N-bit digital audio signal and the M-bit digital video signal from the (N+M)-bit digital signal reproduced by the reproducing means.

According to an additional aspect of the present invention, a first analog-to-digital (hereinafter refer to "A/D") converter converts an analog audio signal into an N-bit digital audio signal in response to a first sampling clock. A second A/D converter converts an analog video signal into an M-bit digital audio signal in response to a second sampling clock. Timing conversion means converts a timing of the M-bit digital video signal from the second analog-to-digital converter such that the digital video signal is synchronized with the first sampling clock. Mixing means forms an (N+M)-bit digital signal by mixing the N-bit digital audio signal from the first analog-to-digital converter as higher bits and the M-bit digital video signal from the timing conversion means as lower bits.

According to another aspect of the subject invention, mixing means forms an (N+M)-bit recording digital signal by mixing an N-bit digital audio signal as a higher bits and an M-bit digital video signal, where the N-bit digital audio signal is obtained by digitizing an analog audio signal in response to a first sampling clock, and the M-bit digital video signal is obtained by digitizing an analog video signal in response to a second sampling clock and processing through a timing conversion means. Separation means separates the N-bit digital audio signal and the M-bit digital video signal from the reproduced (N+M)-bit digital signal. The M-bit digital video signal from the separation means is processed by the timing conversion means. The timing conversion means includes memory means having at least a pair of memories. An input selection switch is provided at the input side of the memory means and is operated in an after-recording mode. The input selection switch receives an input video signal and a reproduced video signal from the memory means. The reproduced video signal read from one memory of the memory means is written in another one of memory through the input selection switch when the after-recording mode is selected. The video signal read from the other memory and to be recorded is coincided with the reproduced video signal read from the one memory.

According to an additional aspect of the present invention, mixing means forms an (N+M)-bit recording digital signal by mixing an N-bit digital audio signal as a higher bits and an M-bit digital video signal, where the N-bit digital audio signal is obtained by digitizing an analog audio signal in response to a first sampling clock, and the M-bit digital video signal is obtained by digitizing an analog video signal in response to a second sampling clock and processing through a timing conversion means. Separation means separates the N-bit digital audio signal and the M-bit digital video signal from the reproduced (N+M)-bit digital signal. The M-bit digital video signal from the separation means is processed by the timing conversion means. The timing conversion means is constructed by memory means. In a recording operation, after the memory means acquires one scene of the M-bit digital video signal, a start code is added to the N-bit digital audio signal having relation with the M-bit digital video signal, and both the digital signals are applied to the mixing means. In a reproducing operation, after the start code is detected from the N-bit digital audio signal from the separation means, the M-bit digital video signal having relation with the N-bit digital audio signal is read from the memory means.

According to another aspect of the subject invention, mixing means forms an (N+M)-bit recording digital signal by mixing an N-bit digital audio signal as a higher bits and an M-bit digital video signal, wherein the N-bit digital audio signal is obtained by digitizing an analog audio signal in response to a first sampling clock, and the M-bit digital video signal is obtained by digitizing an analog video signal in response to a second sampling clock and processing through a timing conversion means. Separation means separates the N-bit digital audio signal and the M-bit digital video signal from the reproduced (N+M)-bit digital signal. The M-bit digital video signal from the separation means is processed by the timing conversion means. The timing conversion means is constructed by memory means. The memory means is controlled for the M-bit digital video signal mixed first by the mixing means in connection with the N-bit digital audio signal such that a scene of at least the M-bit digital video signal is displayed in a line sequential manner until the memory means acquires one scene in a reproducing operation.

According to another aspect of a signal processing apparatus of the present invention, mixing means forms an (N+M)-bit recording digital signal by mixing an N-bit digital audio signal as a higher bits and an M-bit digital video signal, where the N-bit digital audio signal is obtained by digitizing an analog audio signal in response to a first sampling clock, and the M-bit digital video signal is obtained by digitizing an analog video signal in response to a second sampling clock and processing through a timing conversion means. Separation means separates the N-bit digital audio signal and the M-bit digital video signal from the reproduced (N+M)-bit digital signal. The M-bit digital video signal from the separation means is processed by the timing conversion means. The timing conversion means is constructed by memory means. A function switch is provided such that the memory means acquires the M-bit digital video signal in a desired timing manner during a recording operation. The memory means acquires the M-bit digital video signal of a plural sequential scenes determined by the capacity of the memory means when the function switch is activated.

According to another aspect of the present invention, a signal processing apparatus of the subject invention, identification code adding means adds a predetermined identification code to an M-bit digital video signal. Mixing means forms an (N+M)-bit recording digital signal by mixing an N-bit digital audio signal as higher bits and the M-bit digital video signal as lower bits having the identification code added by the code adding means. Separation means separates the N-bit digital audio signal and the M-bit digital video signal from the reproduced (N+M)-bit digital signal. Moreover, means is provided for detecting the identification code from the M-bit digital video signal having the identification code from the separation means and for controlling to detect at least the M-bit digital video signal in accordance with the identification code.

According to further aspect of the present invention, first bit inverting means inverts a desired bit of an M-bit digital video signal. Mixing means forms an (N+M)-bit recording digital signal by mixing an N-bit digital audio signal as higher bits and the M-bit digital video signal from the first bit inverting means as lower bits. Separation means separates the N-bit digital audio signal and the M-bit digital video signal from the reproduced (N+M)-bit digital signal. Second bit inverting means inverts again the bit of the M-bit digital video signal from the separation means, where the bit is inverted by the first bit inverting means.

According to another aspect of the present invention, mixing means forms an (N+M)-bit recording digital signal by mixing an N-bit digital audio signal as higher bits and an M-bit digital video signal as lower bits. Separation means separates the N-bit digital audio signal and the M-bit digital video signal from the reproduced (N+M)-bit digital signal. A character generator generates a video signal of an image to be superimposed. Means is provided for inserting the video signal from the character generator into the reproduced video signal from the separation means. A predetermined image can be superimposed on the scene of the reproduced video signal.

Thus, both the digital audio signal and the digital video signal can be recorded and reproduced simultaneously. Since the digital video signal is positioned at the lower bit side, the digital audio signal can be reproduced without receiving an influence from the digital video signal when reproducing the (N+M)-bit digital signal as the digital audio signal.

The objects, advantages and novel features of the present invention will be apparent from the following detailed description when read in conjunction with the appended claims and attached drawing.

BRIEF DESCRIPTION OF DRAWING

FIGS. 1A and 1B show a block diagram of one embodiment of a signal processing apparatus according to the present invention;

FIGS. 2A-D show one example of digital signal formats;

FIGS. 3 through 6 show identification codes;

FIG. 7 shows a bit inverting process of a digital video signal;

FIGS. 19A and 19B show a block diagram of another embodiment of the signal processing apparatus according to the present invention;

FIGS. 20A-B and 21 show a process of a superimposing operation;

FIGS. 22A and 22B show a block diagram of a further embodiment of the signal processing apparatus according to the present invention; and FIGS. 23 through 26A-F show time charts explaining a line sequence display operation.

DETAILED DESCRIPTION OF THE INVENTION

Figure 1A:
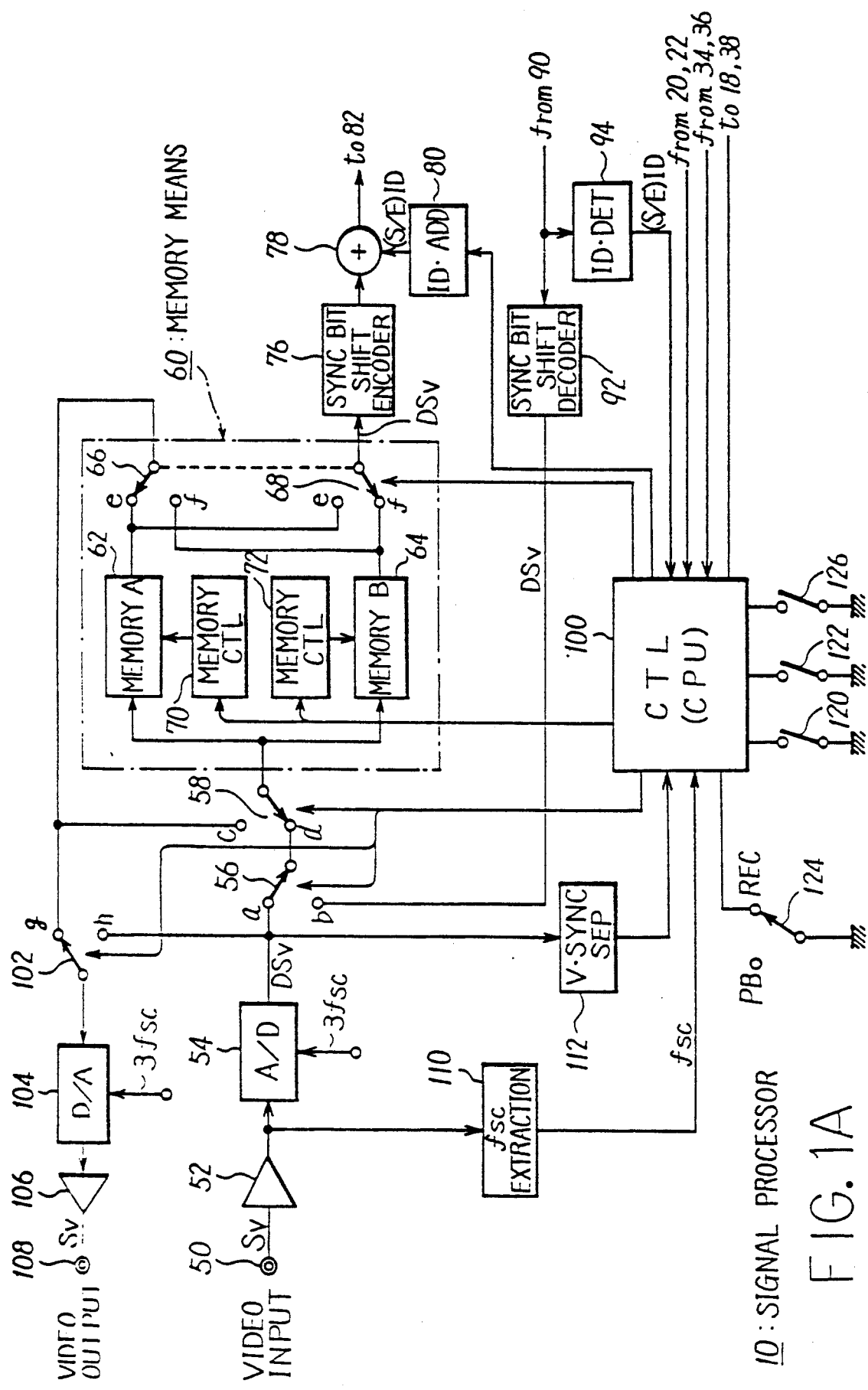

Preferred embodiments of the present invention will be discussed by reference to the attached drawings.

Referring now to FIGS. 2A-D, a format (bit organization) of a digital signal DS is shown where the digital signal consists of a mixture of an audio signal Sa and a video signal Sv. In this embodiment, NTSC video signal is used, but PAL, SECAM or the like can be used as the video signal similarly to NTSC.

This present invention uses a standard bit number of the digital signal DS of the DAT shown in FIG. 2C by considering a compatibility with a conventional system and a quality of the reproduced audio signal. The digital signal DS is divided into two groups as shown in FIGS. 2A and 2B, wherein the higher bit side thereof is assigned to a digital audio signal DSa and the lower bit side thereof is assigned to a digital video signal DSv.

In the audio format standard, assuming that T (positive integer) is a total bit number, N (positive integer) is a bit number of the digital audio signal DSa and the remainder M (=T−N) is a bit number of the digital video signal DSv, a good result may be obtained by selecting as follows when T=16:

$$N >= \tfrac{1}{2}T$$

A useful condition in this situation is N=8 through 10. Thus, the digital video signal DSv may consist of 6 through 8 bits. In this embodiment, N=10 and M=6 as shown in FIGS. 2A and 2B.

The digital audio signal DSa and the digital video signal DSv are mixed such as the digital audio signal DSa is positioned at the higher bit side. Thus, the higher ten bits are assigned to an area of the digital audio signal DSa and the lower six bits are assigned to an area of the digital video signal DSv (FIG. 2C).

If a measure is taken to meet the noise situation of the audio signal Sa, e.g., a noise reduction process is applied to the audio signal Sa, before mixing with the video signal Sv, the relationship of these signal may not be determined by reference to the above expression. In other words, the bit number of the audio signal Sa may be reduced.

The digital signal DS of such a bit format is applied to a rotary magnetic head of the DAT (not shown) in order to record on and reproduce from a magnetic tape.

As described hereinafter, the DAT records both left (L) and right (R) channels of the digital audio signal DSa in sequence, where the left and right channels are sampled in response to a sampling clock fs. The sampled data of the digital video signal DSv is processed to be mixed with the digital audio signal DSa in synchronism with a clock 2 fs in order to be recorded.

Assuming that the frequency of the audio sampling clock fs is 48 KHz and that of the video sampling clock is 3 fsc (fsc=3.58 MHz), a frequency ratio of the video sampling clock 3 fsc to the clock 2 fs is 112. Thus, the digital video signal is sampled every period ⅓ fsc and the sampled data is recorded in sequence every period ½ fs (=112 * ½ fs).

Since one field period is 1/60 seconds, it takes about 1.87 (=1/60 * 112) seconds to record one field video signal. However, an identification code ID is added to the video signal as discussed hereinafter, so that a total recording time of one field video signal may be about 2 seconds.

The period of the audio signal (narration or BGM) corresponding to the image contents of the video signal may be over 2 seconds in general, so that the applied audio for one scene of the image may be recorded for over 2 seconds.

As a result, a plurality of image scenes (or pictures) may be inserted until the audio signal is completed if the audio signal is time referenced.

Taking into consideration a search process, it may be better to add a desired identification code to the video signal (image data) and mix such a video signal with the audio signal. The signal format is determined by reference to such a condition.

Figure 3:
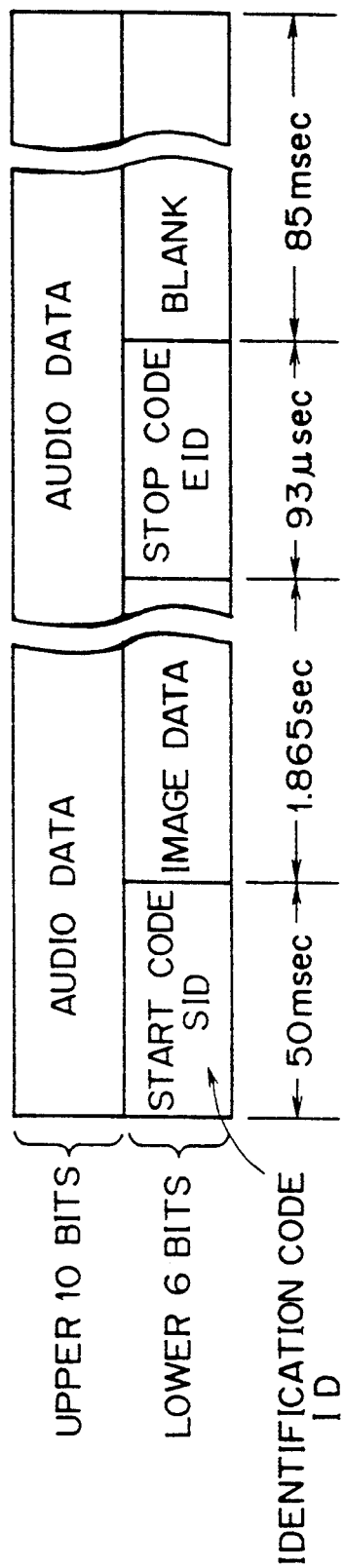

FIG. 3 shows one example of such a format. The identification code ID is added before and after the video signal (image data) to be inserted into the audio signal (audio data). In this example, the identification code ID consists of a start code section SID added just before the video signal and a stop code section EID added just after the video signal.

The start code section SID is used for the following objects.

(1) the identification code only for the video signal data or the image data;

(2) the identification code for explaining the video signal organization, namely, indicating whether the video signal is a composite video signal, a combination of a luminance (V) signal and a color (C) signal, or a component signal of red (R), green (G) and blue (B);

(3) indicating a quantization bit number of the image data; and (4) location search code (LSID) for the image data. These objects are only examples. In order to accomplish these usage objects, the start code section SID would be organized as follows.

FIG. 4 shows an example of such a organization. As shown in this figure, the start code is a six-bit code in which only the least significant bit (LSB) is "1". Similarly, the stop code EID is a code of all "0".

One block consists of six bits, and the start code section SID consists of (4800+1) blocks (about 50 msec). A main block consists of 600 blocks of the start code section, and the same code data are inserted into each the main block. Thus, the start code section SID can be searched regardless of a reproducing start position.

The main block is divided into 20 sub-blocks each having 30 blocks. The first 12 blocks F0-F11 of the sub-block are used for framing codes. When all the blocks of the sub-block are the start codes and "0" is assigned to them, the sub-blocks F0-F11 of "0" are identified as the framing code.

Figures 5A, 5B, 6:
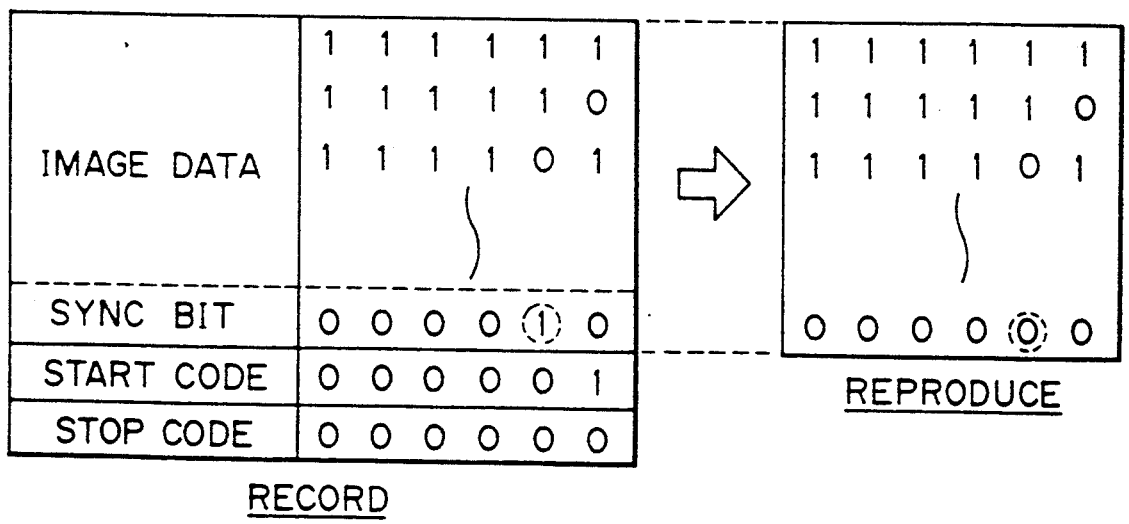

The other eight sub-blocks D0-D7 are used as mode codes. One example of the mode code is shown in FIGS. 5A-B, and the contents thereof are only example.

In this example, the stop code section EID consists of eight blocks (about 83 micro seconds) as shown in FIG. 4. A predetermined blanking period is assigned to the latter half of the stop code section EID. An unit area (about 2 seconds) of one image data is from the head of the start code section SID to the end of the blanking period. This unit area period corresponds to 120 times longer than the vertical period.

Since one phase cycle of the subcarrier fsc is four fields, it is possible to avoid a discontinuity of the subcarrier fsc for the static image video signal Sv recorded continuously by setting the unit area as an integer multiple of four times longer than the vertical period, e.g., as 120 times longer than the vertical period.

FIGS. 1A-B show one embodiment of a signal processing apparatus which processes the digital signal DS as discussed hereinbefore, records it on the DAT, and separates the reproduced digital signal DS into the original audio signal Sa and the original video signal Sv.

A signal process system for the audio signal Sa will be described. The audio signal Sa applied at an audio input terminal 12 is applied through an amplifier 14 to a low pass filter (LPF) 16 so that the bandwidth of the signal is limited. The output signal from the low pass filter is converted into the ten-bit digital audio signal DSa by an A/D converter 18. The audio sampling clock for this digitizing operation is fs (48 KHz).

The digital audio signal DSa is applied to mixing means (adder) 20 of mixing/separation means 86 in order to mix with the digital video signal DSv which will be described hereinafter.

The result digital signal DS (FIG. 2C) is applied to a digital output processing circuit 22 for converting it into a digital signal having a standard audio format.

As is well known, the digital output processing circuit 22 includes clock generation means for producing a bit clock BCK. The formatted digital signal DS is applied through a terminal 24 to a rotary magnetic head in order to record it.

The digital signal reproduced by the rotary magnetic head is applied via a terminal 32 to a digital processing circuit 34 which processes it for the digital input. For example, a phase lock loop (PLL) circuit (not shown) is activated to produce a reproducing bit clock BCK in synchronism with a master clock.

A separation signal is produced in accordance with the master clock to separate the digital signal into the digital audio signal DSa and the digital video signal DSv. Thus, the next stage, separation means 36, generates the separated digital audio signal DSa and the separated digital video signal DSv (FIGS. 2A and 2B).

A digital-to-analog (D/A) converter 38 converts the separated ten-bit digital audio signal DSa into an analog signal whose bandwidth is limited by a low pass filter 40. The output signal from the low pass filter 40 is applied through an amplifier 42 to an audio output terminal 44.

The signal processing system of the video signal will be discussed hereinafter. The video signal Sv of the static image at an video input terminal 50 is applied via an amplifier 52 to an A/D converter 54 which converts it into a six-bit digital video signal DSv. The frequency of the sampling clock for this conversion is an integer multiple of the subcarrier fsc, e.g., 3fsc in this embodiment.

The digital video signal DSv is applied to memory means 60 via a selection switch 56 for selecting the input signal or the reproduced signal and another selection switch 58 for postrecording.

The memory means 60 operates as timing converting means for the digital video signal DSv. In other words, the memory means 60 is used to expand the timing of the digital video signal DSv when reading it in synchronism with the bit clock BCK in order to combine the digital video signal DSv with the digital audio signal DSa, and the memory means 60 is used to reduce the timing the reproduced digital video signal DSv.

The memory means 60 includes a pair of memories 62 and 64 and associated memory control (CTL) circuits 70 and 72. The digital video signal DSv is stored in the memory 62 or 64 alternately every field under control of the memory control circuits 70 and 72.

In a case that only a single scene or picture is inserted in a single shot mode, one-field video signal is stored in one the memories. In a case that the same scene is inserted continuously, the stored video signal is read repeatedly. In a case that different scenes are inserted continuously, the video signal is acquired at intervals of a predetermined period and stored in the memory 62 or 64 alternately. Since it takes about two seconds to read the data from the memory 62 or 64, the predetermined period should be over two seconds.

The writing clock of the memories 62 and 64 is 3fsc and the reading clock thereof is 2fs in order to match the timing of the digital video signal DSv against that of the digital audio signal DSa with keeping the synchronization.

A reference number 100 represents control (CTL) means for the memories or the like which receives the subcarrier fsc extracted by a subcarrier extraction circuit 110. The control means 100 applies a control signal to the memory control circuits 70 and 72 in response to the subcarrier fsc.

A switch 124 controls the recording mode or the reproducing mode of the signal processing apparatus 10, and the mode is determined by reference to the selection condition of this switch. A switch 126 is a code insertion switch which is used to insert the start code SC for the audio signal into the sub-code of the DAT. However, this operation will be discussed in detail hereinafter.

The control means 100 receives the bit clocks BCK from the digital output processing circuit 22 and the digital input processing circuit 34. Thus, the control means 100 applies control signals to the memory control circuits 70 and 72 so as to generate readout clocks RCK (=2fs) in synchronism with the bit clock BCK.

As a result, both the digital audio signal DSa and the digital video signal DSv are applied to the mixing means 20 in synchronism with the bit clock BCK.

The digital output processing circuit 22 produces a bit switch signal BS for switching between the 10-bit mode and the 6-bit mode in response to the bit clock BCK, but the detail operation will not be discussed. The mixing means 20 receives the bit switch signal BS and mixes the 10-bit digital audio signal DSa and the 6-bit digital video signal DSv as shown in FIG. 2C.

A reference number 112 represents a vertical synchronization (sync) signal separation circuit which extracts or separates the vertical sync signal from the digital video signal DSv and applies it to the control means 100. As a result, each of the memories 62 and 64 can store one field of the digital video signal DSv by reference to the vertical sync signal.

A pair of output selection ganged switches 66 and 68 are provided at the next stage of the memories 62 and 64. The output selection switch 68 is used for the signal recording period, and the other output selection switch 66 is used for the signal reproducing period.

The digital video signal DSv read alternately from the memories 62 and 64 by the output selection switch 68 is applied to a sync bit shift encoder 76 which process to shift the sync bit.

Since the video signal is converted into the six-bit data by the A/D converter, it is general that the sync bit is a digital data of all "0". However, only the sync bit is processed to be bit shifted because the identification code ID is applied to the bit which has no relation to the image as shown in FIG. 6 by considering the above discussed identification code ID. Thus, it is possible to distinguish the identification code ID from the sync bit.

In the recording operation, the sync bit is shifted by one bit and the identification code ID is added by an adder 78. A reference number 80 represents a generator for the identification code ID.

A signal processing circuit 82 acts as a parallel-to-serial (PS) converter for the digital video signal DSv having the identification code ID. Moreover, in this circuit 82, the most significant bit (MSB) of the digital video signal DSv is bit inverted. This process will be discussed hereinafter.

After completing the predetermined signal processing operation for the digital video signal DSv, a format conversion circuit 84 converts the format of this digital video signal into the format satisfying the DAT standard. The output signal from the format conversion circuit 84 is mixed with the digital audio signal DSa as shown in FIG. 2C and the mixed signal is transferred to the DAT.

When reproducing the digital signal DS, the separation means 36 separates the digital audio signal DSa and the digital video signal DSv. The format of the separated digital video signal DSv is converted into the original format by a format inversion circuit 88. A signal processing circuit 90 executes the serial-to-parallel (SP) conversion for the output signal from the format inversion circuit 88 and inverts the MSB of the digital video signal DSv again.

After that, a sync bit shift decoder 92 shifts the output signal from the signal processing circuit 90 reversely with respect to the sync bit recording operation in order to obtain the original sync bit (see FIG. 6).

The digital video signal DSv from the sync bit shift decoder 92 is applied to the memories 62 and 64 via the selection switches 56 and 58. Thus, the reproduced digital video signal DSv is written in these memories in response to the writing clock WCK (=2fs) synchronized with the bit clock BCK. The memories are read in response to a readout clock RCK (=3fsc) having relation to the subcarrier fsc.

The digital video signal DSv from the output selection switch 66 is applied via an input/output monitor selection switch 102 to a D/A converter 104 which converts its input into an analog signal. The converted signal is applied through an amplifier 106 to a video output terminal 108. Monitor means (not shown) is provided at the video output side.

Identification code detection means 94 is provided at the output side of the signal processing circuit 90 to detect the identification code ID, and the detected identification code ID is applied to the control means 100. This identification code ID is used to control the memory control circuits 70 and 72, and the signal processing operation is modified by reference to the mode information.

When the digital video signal DSv having the identification code ID is reproduced and stored in the memory means 60, only image data is stored. In this instance, the final image data appears when a predetermined time has passed from the initial data of the image data. In order to detect accurately the final image data, time management is done and the stop code section EID is detected. It may be desirable that the final image data is determined when the time management result matches the stop code detection. After completion of storing the final image data, the operation modes of the memories 62 and 64 are changed from the writing mode to the readout mode and the output selections of the switches 66 and 68 are changed.

If the reproducing mode of the DAT stops during the reproducing period of the digital video signal DSv, the reproduced output data at the terminal 32 is all "0" as shown in FIG. 7. Since the time management (counting-up operation) for the image data is executed in the signal processing apparatus 10, the counting-up operation will be continued even if the DAT changed to the stop mode.

Thus, the memory means 60 is kept in the writing mode, so that the data of all "0" may be stored as the image data in the memory, e.g., the memory 64.

After a predetermined time has passed from the stop mode, it is the reproducing time for the final image data. In this instance, the reproduced data is all "0", so that this data is judged by mistake as the stop code section EID. The signal processing apparatus 10 regards that the final image data is applied, and instructs the memory means 60 to change from the writing mode to the readout mode and the selection switches 66 and 68 to change the their selection. Thus, the memory 64 is controlled to the readout mode.

The data "0" stored in the memory 64 after the stop mode of the DAT is read and monitored as the image. The image of the data "0" is black display, and an improper image may be monitored.

In order to avoid this effect, the MSB of the image data is inverted and recorded and the reproduced MSB is inverted again. Thus, the result MSB is "1" as shown in FIG. 7 even if the reproduced output of the stop mode is all "0".

Thus, the signal processing apparatus 10 has the following advantages.

(1) avoiding to misjudge the data as the final image data; and (2) avoiding to control to change the operation mode of the memory means 60.

The previous scene is monitored always because of the advantage (2), so that the above discussed disadvantage is improved.

As shown in FIG. 1A, at least two function switches 120 and 122 are provided at the signal processing apparatus 10. One of these switches is a mode switch and the other one is a shutter switch. The mode switch 120 is used to select whether the scene to be inserted is a single shot scene or a sequential scene. The shutter switch 122 is used to select the desired scene to be inserted when the inserted scene is in the single shot mode.

The postrecording operation will be discussed hereinafter. When postrecording the audio signal, the inserted image is not changed. The DAT is changed in the reproducing mode and the screen is monitored. When the scene corresponding to the postrecording is displayed, the postrecording mode is selected. The memories 62 and 64 are switched alternately between the writing and reading modes. However, the operation mode of the memory is fixed while postrecording the audio signal.

For example, when the postrecording mode is selected while monitoring the image data of the memory 62, the image data of the memory 62 is always monitored and the image data of the memory 64 can be recorded in the DAT.

The image data of the memory 62 is not equal to that of the memory 64 in general. Since an operator does the postrecording operation by watching the monitor screen, the scene of the monitor would be different from the scene to be recorded by the postrecording operation.

In order to avoid this phenomenon, the scene to be monitored should be the scene to be recorded in the postrecording mode. For this end, the selection switch 58 for the postrecording is provided in a hardware.

The postrecording mode will be described by reference to FIGS. 8A–G. It is assumed that the selection switches 66 and 68 are in the condition shown in FIGS. 1A–B (see FIG. 8F).

Figure 8:
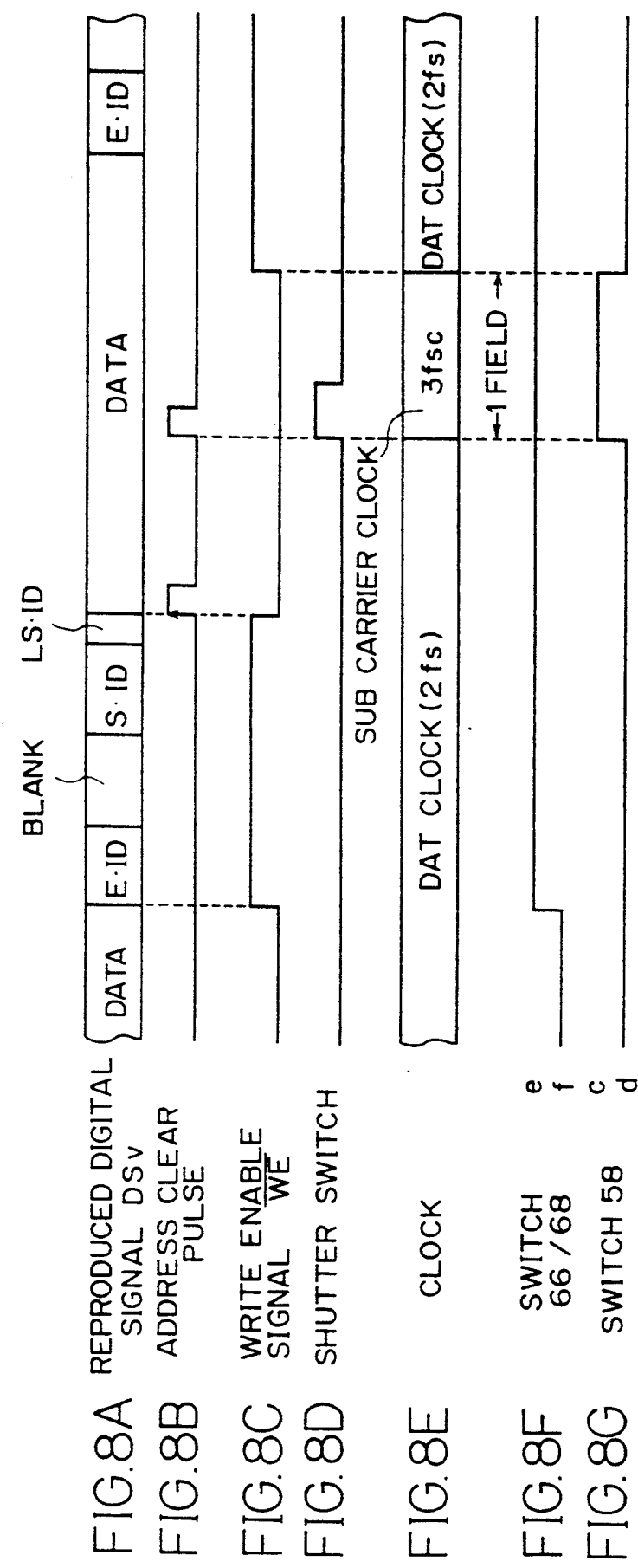
FIGS. 8A-G show a time chart for explaining a post-recording process.

A write enable signal/WE is outputted not to store the identification code ID added to the digital video signal DSv (FIGS. 8A and 8C). When the location search code LSID of the identification code ID is detected, an address clear pulse will be output (FIG. 8B). When the shutter switch 122 is pushed while the memory 64 is in the writing mode (FIG. 8D), the control means 100 judges the postrecording mode and fixes the operation mode of the memory means 60 to the previous operation mode.

The frequency of the writing clock RCK for the memory 64 is changed from 2fs to 3fsc immediately after the postrecording switch 58 is changed to the terminal C of FIG. 1A (FIG. 8E). Then, the image data of the memory 62 is applied to the memory 64 via the postrecording switch 58. Thus, a high speed rewriting operation may be realized. Therefore, the image data of the memory 62 may be equal to that of the memory 64, and the monitor scene may be equal to the image data to be recorded.

After completing the writing operation, the write enable signal/WE for the memory 64 is inverted and the image cannot be written. The postrecording switch 58 may return to the original position automatically, i.e., the switch may be changed to the terminal d (FIG. 8G). For releasing the postrecording mode, the shutter switch 122 is pushed during the reproducing mode or the mode switch 120 is sequentially changed.

Figure 9:
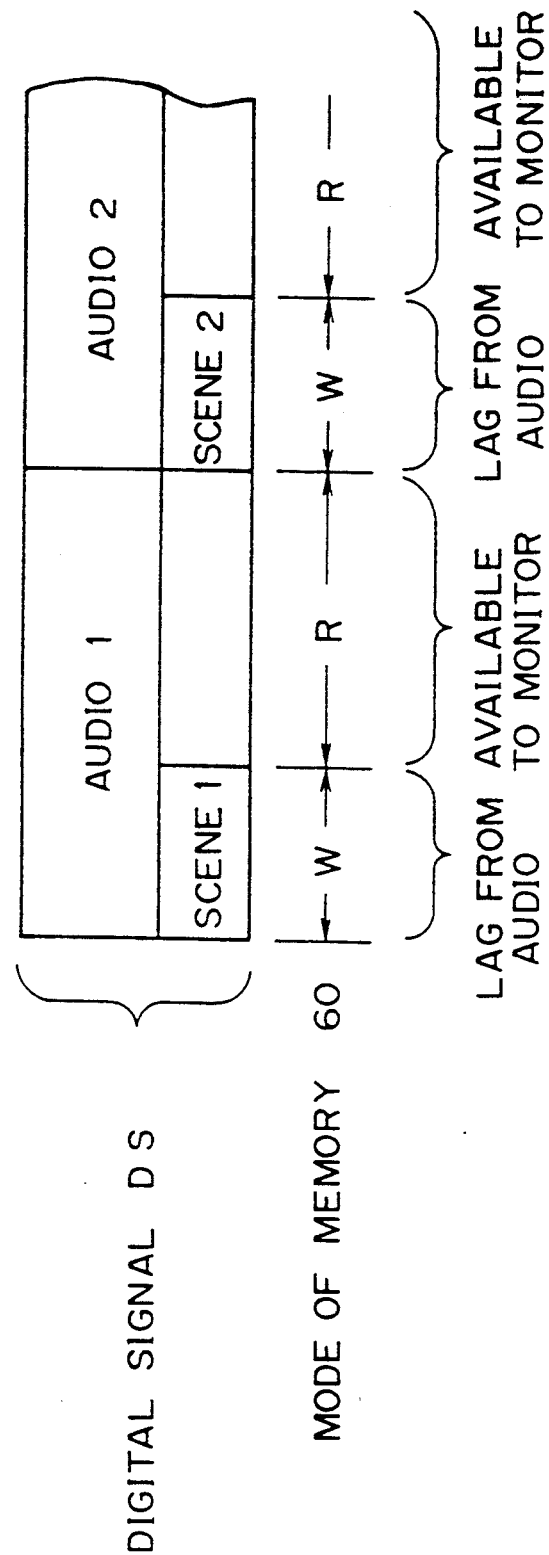
FIGS. 9 and 10A-E show time charts for explaining an operation of a monitor.

It takes about two seconds to store the video signal of one scene in the memory means 60. For example, when reproducing the digital signal DS in which one scene 1 is inserted for one audio signal (e.g., audio 1) as shown in FIG. 9, there may be no image on the monitor screen until the video signal of the initial scene (scene 1) is completely stored in the memory means 60 (about 2 seconds). After the video signal of the initial scene 1 is completely stored, the scene may be monitored on the screen. However, the audio is already reproduced. As a result, timings of the monitored scene and the audio are lagged by 2 seconds at the initial period.

Figure 10:
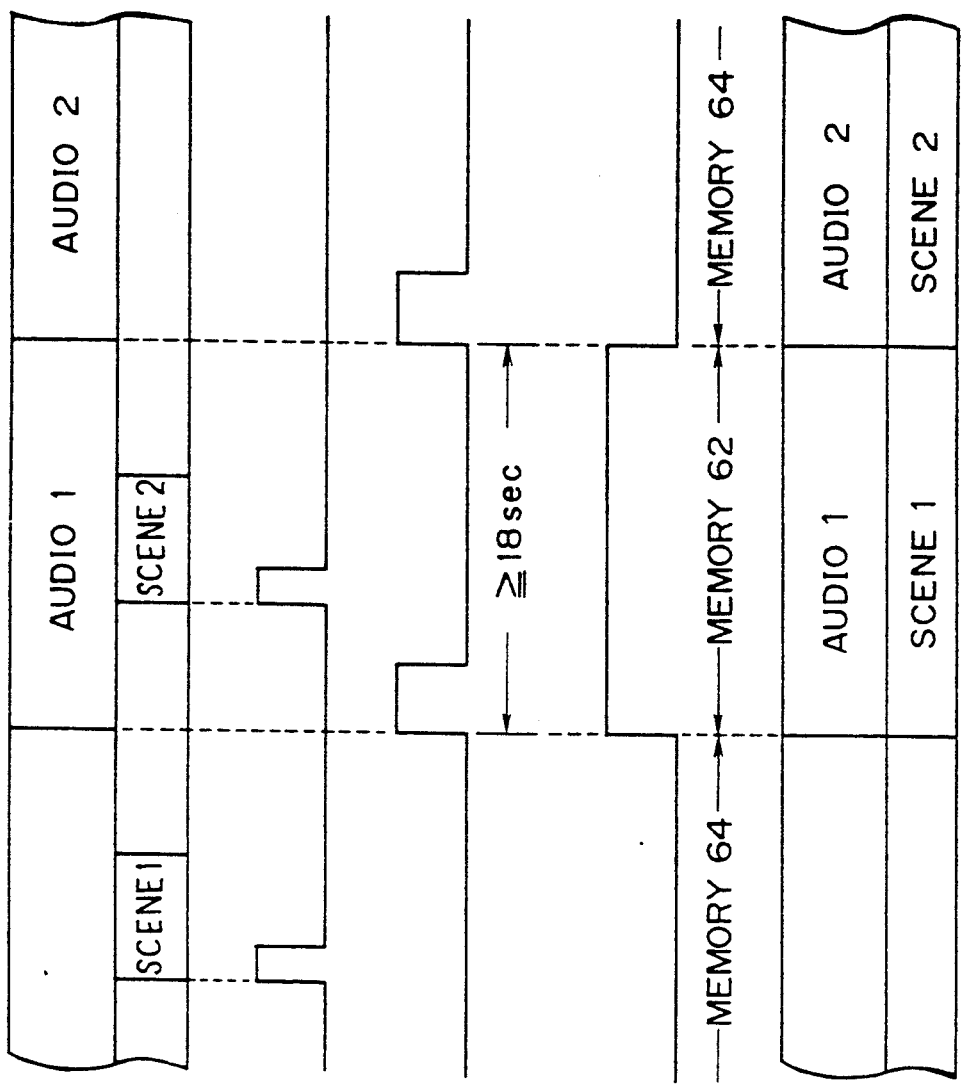

In order to avoid this phenomenon, the insertion timing of the video signal should be shifted previously by a predetermined time. For this end, as shown in FIG. 10A, the video signal (scene 1) corresponding to the audio signal (audio 1) is previously acquired before the audio signal is recorded. The video signal is acquired by controlling the shutter switch 122 (FIG. 10B).

After a predetermined period has passed from the acquisition of the video signal, the start code SC of the DAT sub-code (FIG. 10C) is input so as to acquire the audio signal. The start code SC is input by the code insertion switch 126 as shown in FIG. 1A.

When the code insertion switch 126 is activated, the control means 100 applies an instruction to the digital output processing circuit 22 and the start code SC based on the DAT format is inserted into the digital audio signal DSa. Then, the digital audio signal DSa is applied to the mixing means 20 in synchronism with the insertion of the start code SC.

The predetermined period is determined by the period while the reproduced digital video signal DSv is stored in the memory means 60 (about two seconds).

The digital video signal DSv is stored in the memory means 60 for the reproducing period. When the start code SC is detected after the digital video signal DSv of one scene is stored, the control means 100 transfers the selection control signal to the memory means 60, the selection of the switches 66 and 68 are changed in synchronism with the start code SC and the memory means 60 becomes in the readout condition (FIG. 10D).

As a result, the readout operation of the memories 62 and 64 is synchronized with the audio signal, so that the scene would not appear on the monitor with being delayed from the audio (FIG. 10E).

The sequence mode of the video signal will be discussed. As described hereinbefore, when the mode switch 120 is changed to the sequential side, the video signal at the terminal 50 is acquired automatically in the memory means 60 at intervals of about 2 seconds. On the other hand, the video signal of one field is acquired every time when the shutter switch 122 is pushed while the mode switch 120 is changed to the single side. The acquisition interval should be at least two seconds because it takes about two seconds to read the data from the memory means 60.

In a case that the scene is inserted into the audio signal in real time, it is desirable to acquire the scene in sequence. It is necessary to acquire some sequential scenes especially for the moving image. However, the sequential mode may be impossible if the acquisition timing of the video signal is set by considering the data readout period of the memory means 60.

Thus, the sequential mode is added to acquire the sequential scenes. A number of scenes acquired in sequence depends on a number of the memories. Since this embodiment employs two memories 62 and 64, the maximum number of scenes to be acquired is two within the period while the video signal of one scene is recorded, i.e., within the readout period of the memories 62 and 64 (about two seconds in this embodiment as discussed hereinbefore).

Figure 11:
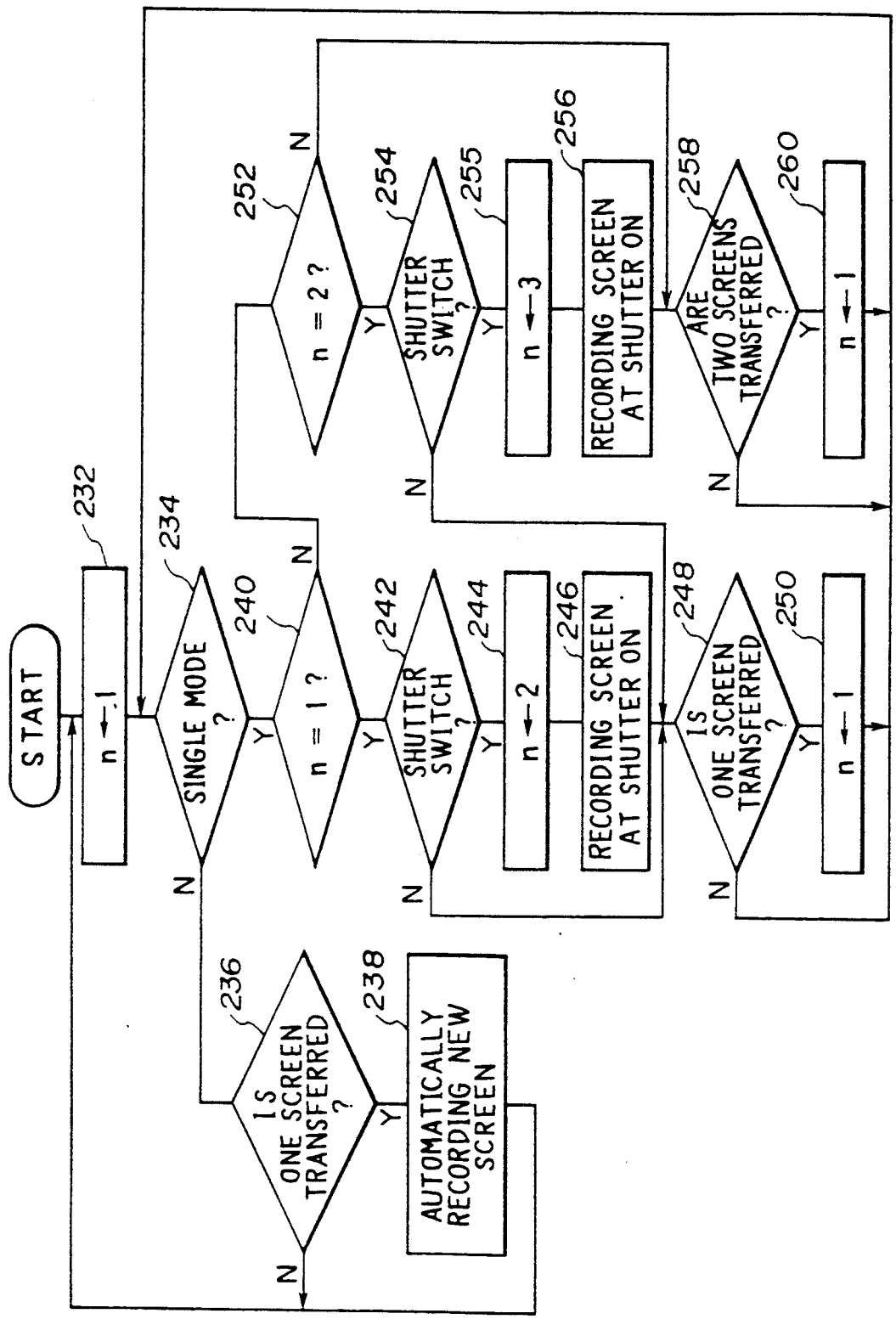
FIG. 11 shows a flow chart of accomplishing a continuous display mode.

FIG. 11 shows a flow chart of one example of the sequential mode control program for a central processing unit (CPU) of the control means 100, and this program will be discussed by reference to FIG. 12.

A count value n of a counter is set to an initial value 1 (step 232), and the single mode is checked (step 234). If the single mode is not selected, the CPU checks the transmission condition of the image data of one scene (data readout condition of the memories 62 and 64) (step 236). If the image data is completely transferred, the video signal of the next scene is automatically written in the memory means 60 (step 238). This is the described sequential mode.

In the single mode, the contents of the counter is checked (step 240). If the counter value is the initial value (=1), the operation condition of the shutter switch 122 is checked (step 242). When the shutter switch 122 is pushed, the counter is incremented (=2) (step 244). Then, the memory means 60 stores the video signal when the shutter switch 122 is pushed (step 246).

Figure 12:
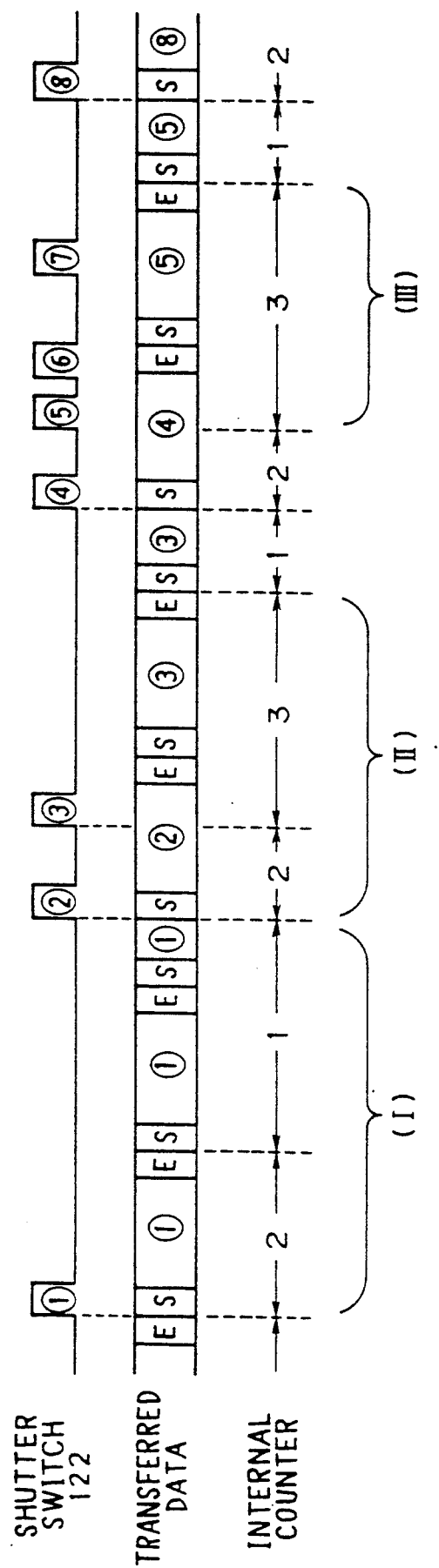
FIG. 12 shows a time chart of the continuous display mode.

As shown in (1) of FIG. 12, the counter is reset to the initial value and returns to the standby condition after completing the transfer of the image data of the one scene (steps 248, 250 and 234). It takes 1/60 seconds to acquire the video signal of one scene.

In the single mode, when the shutter switch 122 is activated repeatedly, the counter value keeps "2" as shown in (II) of FIG. 12 before the image data of one scene is completed to be transferred at that timing. Thus, this situation is passed through the steps 240 and 252 to a step 254, where the operation condition of the shutter switch 122 is checked.

When the second operation is detected, the counter is incremented (=3) (step 255). Then, the memory means 60 stores the scene of the video signal at the second operation of the shutter switch (step 256). When the second transmission of the video signal is completed, the apparatus is in the standby condition after the counter is reset to the initial value (steps 258 and 260).

When the shutter switch 122 is operated for acquiring the third scene during the transmission period of the image data for the second scene after the second scene is acquired, the video signal may not be acquired because this operation timing is in the period while the video signal is recorded (see (III) of FIG. 12).

While the second scene is acquired, the counter value remains at "3" because the counter is not reset to the initial value as understood from the steps 258 and 260. When the shutter switch 122 is pushed in this situation, the counter value is checked in step 252. Since the process advances directly to step 258 if the counter value is not "2", the third scene may not be acquired.

Thus, even if the shutter switch 122 is activated twice or over twice within two seconds, only the initial two scenes may be acquired. By recording the scenes in this sequential mode, each scene can be monitored for two seconds in the reproducing mode.

According to this invention constructed as discussed hereinbefore, both the audio signal Sa and the video signal Sv can be mixed in the current audio format. In this instance, the quantization bit number of the audio signal Sa is decreased from 16-bit organization to 10-bit organization without having a bad influence on the audio signal. Moreover, 6-bit quantization may be enough for the video signal because it is a static image.

Figure 13:
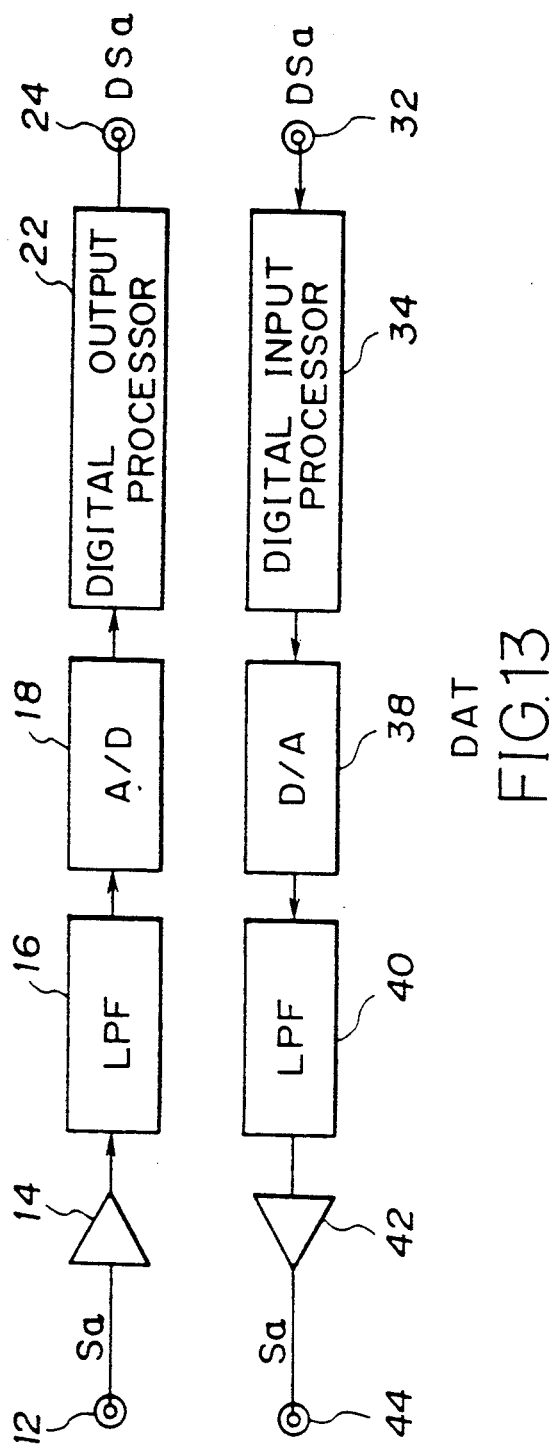
FIG. 13 shows a block diagram of one example of a current DAT.

Even if a current DAT reproduces the digital signal DS including the audio signal Sa and the video signal Sv, i.e., even if the digital video signal DSv is reproduced as the digital audio signal DSa by a DAT not including the video reproduction system as shown in FIG. 13, the audio signal may not receive bad influence.

In this instance, the video signal Sv may be a noise component for the audio signal Sa. However, a dynamic range of the audio signal Sa may be about 6 Ndb, because the digital video signal DSv is inserted as the lower bits with respect to the digital audio signal DSa as shown in FIG. 2C.

By selecting about 10 bits as the quantization number N, the dynamic range may satisfy the level of the compact cassette or Dolby B (trademark). Thus, when the video signal is reproduced simultaneously with reproducing the audio signal, the audio signal Sa may not receive a substantially bad influence from the video signal.

If the bit coupling position is modified such that the LSB data V0 of the digital video signal DSv is positioned at the side of the LSB data A0 of the digital audio signal DSa as shown in FIG. 2D, the audio signal Sa may not receive substantially completely bad influence.

This reason will be discussed hereinafter. When the digital video signal DSv is added to the lower bit side of the digital audio signal DSa, the MSB bit data V5 of the digital video signal DSv is positioned at the MSB of the video area and the LSB data V0 thereof is positioned at the LSB of the video area in normal as shown in FIGS. 2B and 2C.

Figure 14:
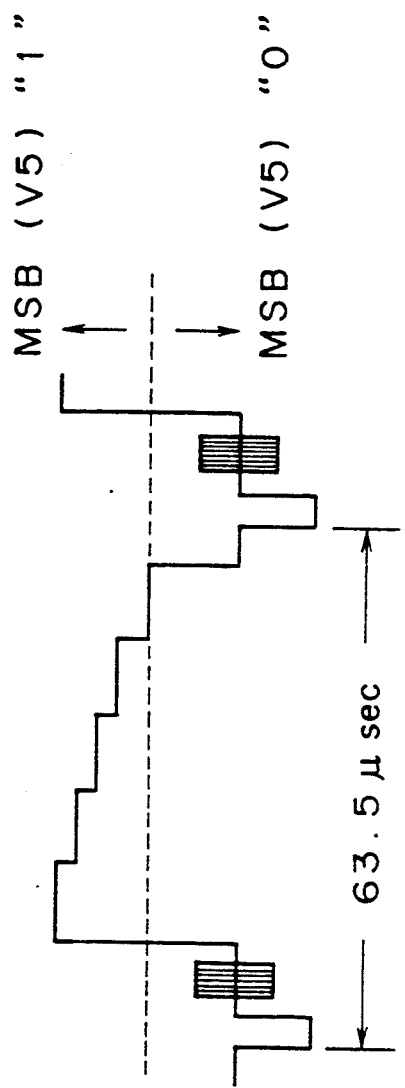
FIG. 14 shows a waveform of a video signal.

When the video signal Sv is digitized, as shown in FIG. 14, the MSB (=V5) may be "1" for the luminance level higher than the center luminance level (dotted line) as a reference level and the MSB may be "0" for the luminance level lower than the reference level.

The video signal Sv is a cyclic signal repeated every horizontal period. One horizontal period is about 63.5 micro seconds. Since the timing of the video signal is expanded by 112 times for the recording and reproducing operations, the reproduction frequency may be about 140 Hz (1/(63.5 micro seconds * 112)=140 Hz).

Figure 15:
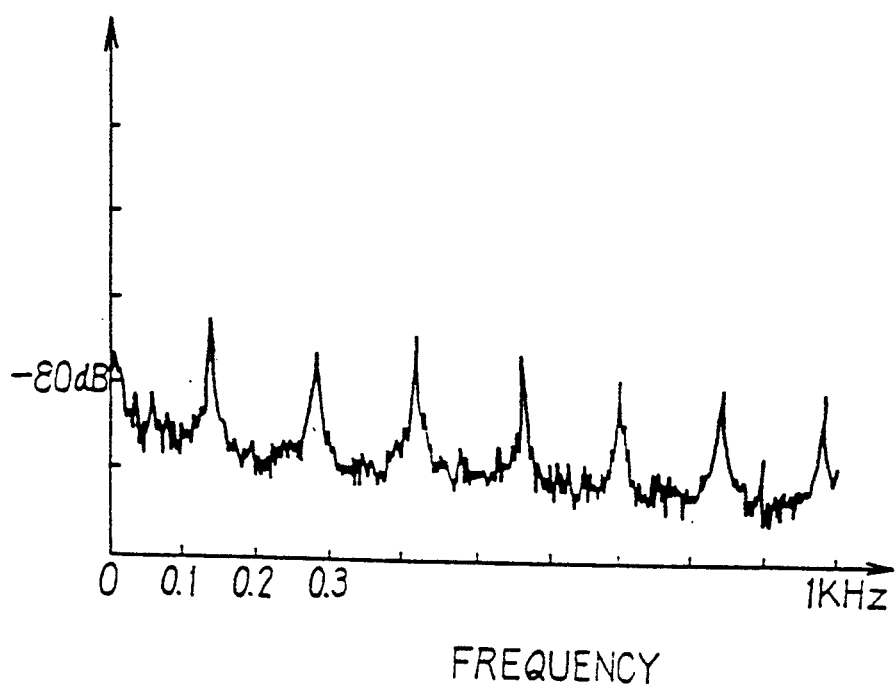
FIGS. 15 through 18 show frequency spectrum diagrams of a reproduced video signal.
Figure 16:
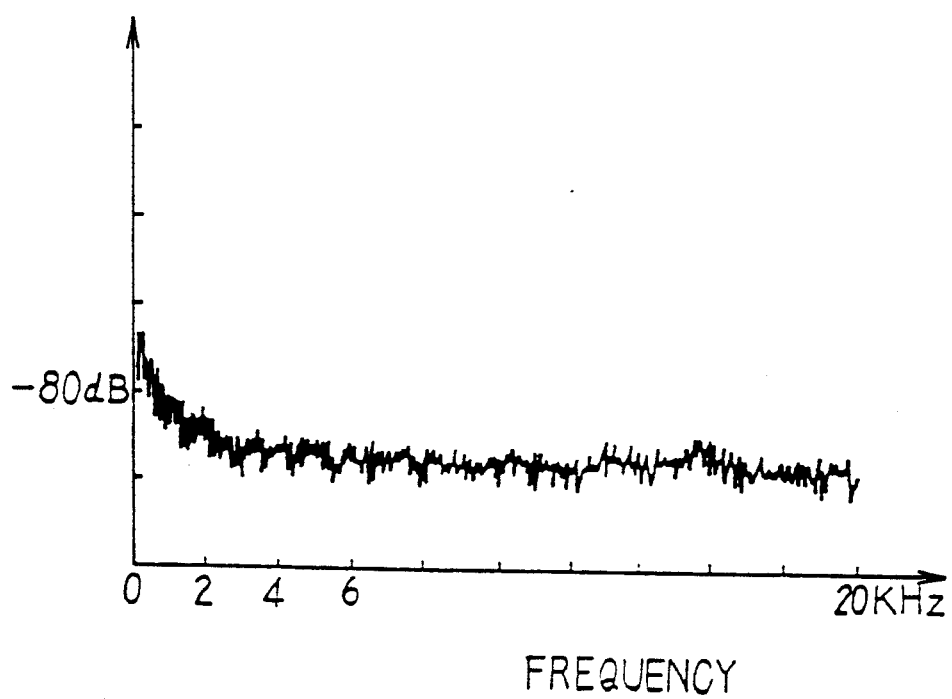

FIG. 15 illustrates a spectrum diagram of the reproduced frequency where noise peak appears every about 130 Hz. FIG. 16 illustrates a spectrum diagram in which a frequency range is expanded to 20 KHz.

In the reproducing operation, about −60 dB of the reproduced frequency level is inserted as noise to the reproduced audio signal Sa. Thus, a listener may sense slightly the reproduced video signal as noise.

On the other hand, according to this invention, the digital video signal DSv is added to the digital audio signal DSa by changing the bit weight of the video signal as discussed hereinbefore. In other words, if the MSB data V5 is positioned at the LSB and the LSB data V0 is positioned at the MSB, the reproduced level of the MSB data V5 is very small and does not affect the reproduced audio.

Since the LSB data V0 varies frequently within one horizontal period, the reproduced frequency of the reproduced LSB data V0 is very high. Thus, it appears as white noise.

However, the reproduced frequency is very high and the reproduced output level is very small, so that this component does not affect the total output. Thus, noise in the reproduced audio signal Sa can be reduced very much by comparison with the organization of FIG. 2C.

Figure 17:
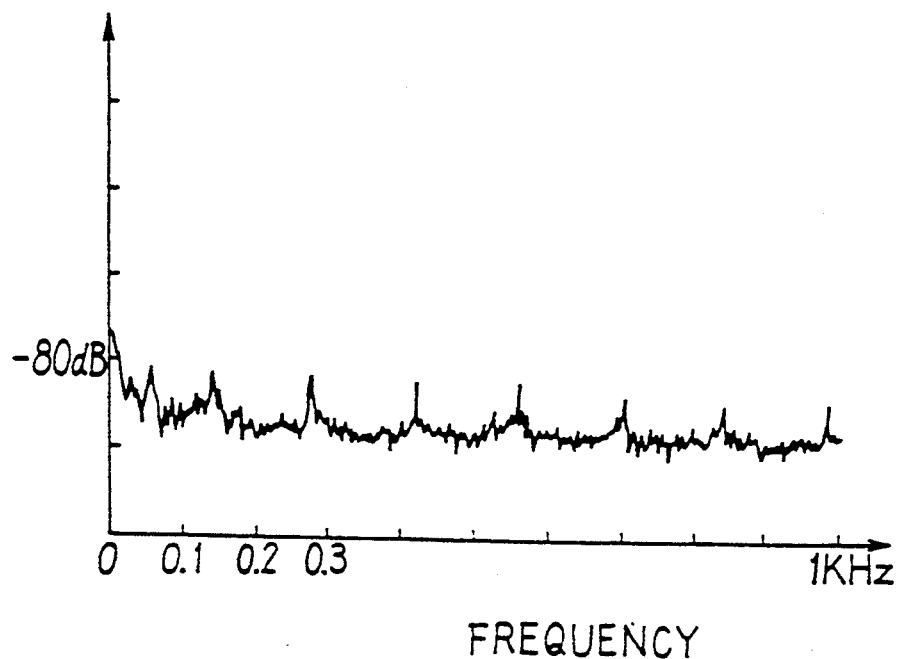
Figure 18:
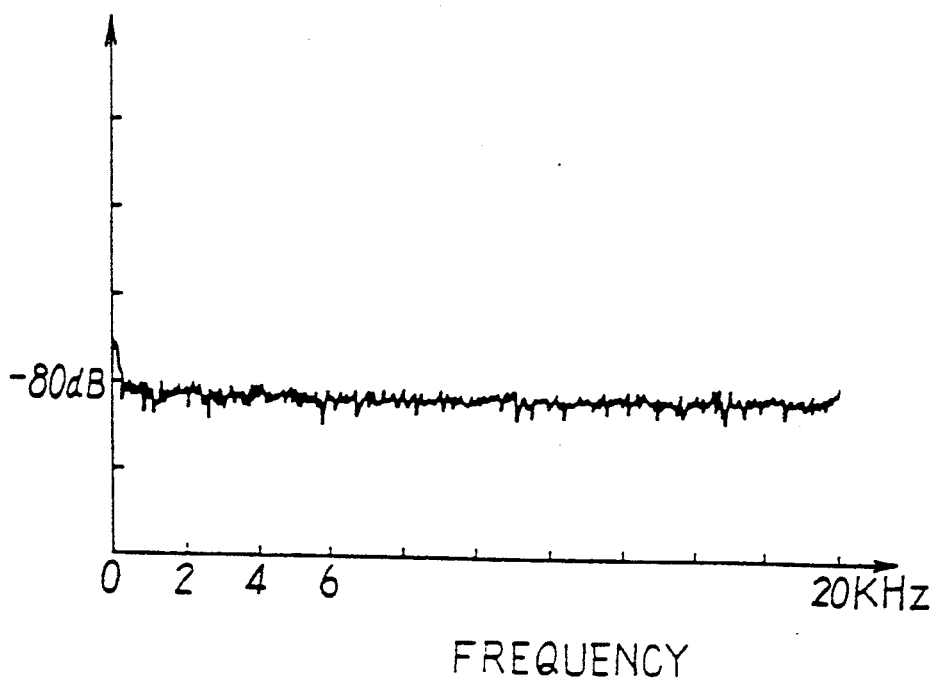

FIGS. 17 and 18 illustrate the reproduced frequency spectrum diagrams in which the video data is organized as shown in FIG. 2C. These FIGS. 17 and 18 correspond to FIGS. 15 and 16, respectively.

Figure 19A:
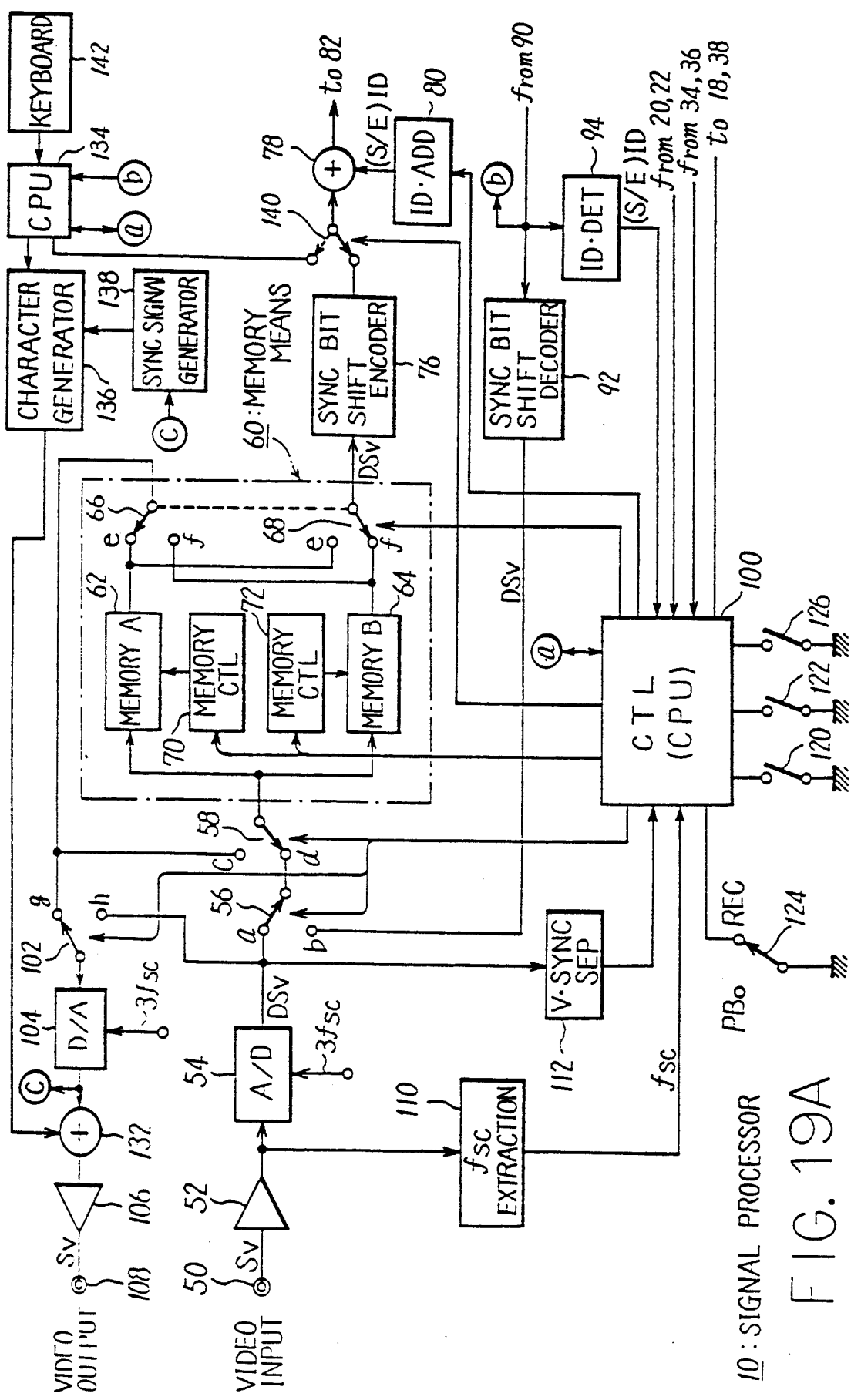

FIGS. 19A and 19B show another embodiment of the signal processing apparatus according to this invention. This embodiment has a function to superimpose a special image on a static scene. In FIGS. 19A-B, the same elements as FIGS. 1A-B are represented by the same reference numbers and the detailed description thereof will not discussed.

In this embodiment, the digital video signal DSv whose bits are processed by the sync bit shift encoder 76 is applied to the adder 78 via a selection switch 140 which is used for inserting the image information (code data) for the superimposing operation. The switch 140 is controlled by the control means 100.

A character generator 136 is used for superimposing a predetermined image on the monitor screen. A CPU 134 controls the operation of the character generator 136. The CPU is connected to a keyboard 142 for receiving the superimposing image information, such as the timing the kind of scene and the period of the image to be superimposed.

A sync signal generation circuit 138 receives the reproduced video signal from the D/A converter 104 via a line C. Then, the sync signal generation circuit 138 generates the horizontal and vertical sync signals in synchronism with the reproduced video signal, and these sync signals are applied to the character generator 136. Thus, the superimposed image is synchronized with the monitor screen.

The video signal of the image to be superimposed is applied from the character generator 136 to an adder 132 provided between the D/A converter 104 and the amplifier 106, and this video signal is mixed with the reproduced video signal. The character generator 136 may be, for example, a read only memory (ROM) storing a predetermined image.

This embodiment is constructed as described hereinbefore, and the other portions are the same as FIGS. 1A-B. The operation of this embodiment is the same as FIGS. 1A–B except the superimposing mode which will be discussed hereinafter.

The superimposing mode is a special mode in which a special image Y is inserted or added to the monitor image X. The representative examples are shown in FIGS. 20A and 20B.

In order to accomplish such a special mode, the following process and operation may be done. The superimposing mode needs at least information (image information) regarding the monitor image, the image to be superimposed, the screen area and the insertion period. For this end, the image information (superimposing data) should be inserted instead of the video signal into the audio signal as shown in FIG. 21. The insertion data would be input through the keyboard 142.

While the image data is inserted, the selection switch 140 is in the condition shown by the doted line. This switching operation is instructed by the control means 100.

In the reproducing operation, when the image information is inserted, a code indicating such a situation is inserted into the start code section SID of the identification code ID in this embodiment in order to use this image information only for the superimposing operation. This example is shown in FIG. 5B.

When the superimposing mode is detected from the start code section SID in the reproducing operation, the control means 100 transmits a control signal via a line a to the CPU 134 such that the CPU 134 acquires the next data. The image data is acquired through a line b.

Even if the stop code section EID inserted at the end portion of the image information is detected at this process, the memory means 60 is controlled such that the selection switches 66 and 68 are not changed. Thus, the video signal of the scene 1 is continuously read as shown in FIG. 21 for the period that the image information is inserted. Therefore, the same scene as the previous scene is continuously monitored for this period.

Since a special identification code ID is not added to the image data 2 inserted after the image information, the monitor screen is changed to the scene 2 when the stop code section EID is detected. Then, the special image specified by the image information is read from the character generator 136, and it is superimposed on a predetermined position of the monitor scene 2 for the predetermined period. After the predetermined period has passed, the normal monitor operation may be recovered. The CPU 134 manages the position of the inserted image, the insertion position, the predetermined period or the like.

Figure 22B:
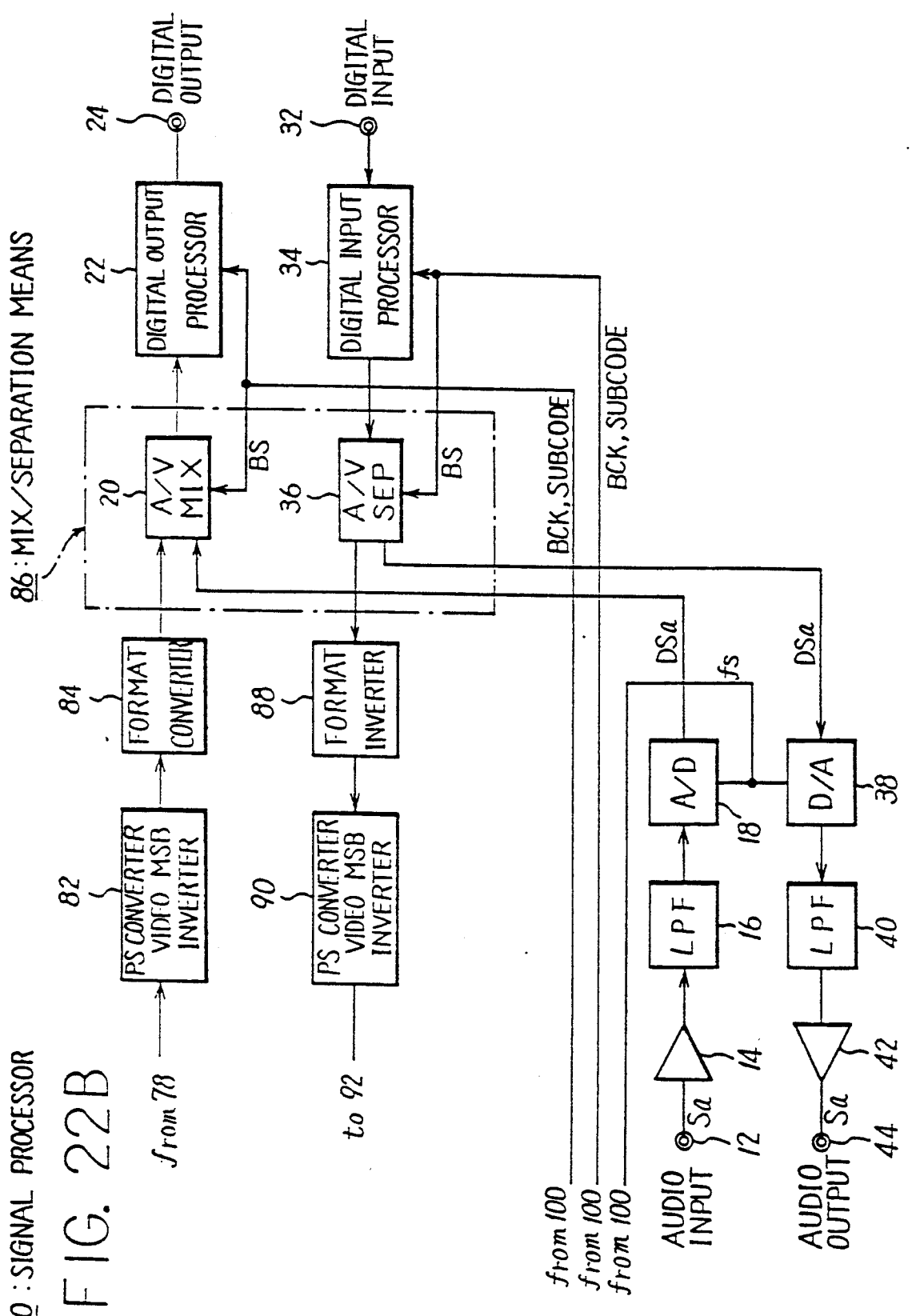

FIGS. 22A and 22B illustrate an additional embodiment of the signal processing apparatus 10 according to this invention.

In the above discussed embodiment, the insertion timing of the video signal is previously lagged by the predetermined time in order to avoid that the initial monitor image is delayed with respect to the audio. However, in this embodiment, the monitor image is displayed in a line sequence. In this FIGS. 22A–B, the same elements as FIGS. 1A–B are represented by the same reference numbers, and the detailed description will be eliminated.

In this embodiment, buffer memory means 130 receives the digital video signal DSv whose sync bit is shifted reversely with respect to the recording operation by the sync bit shift decoder 92. The buffer memory means 130 includes a pair of line memories, e.g., 2H line memories 132 and 134 in this embodiment. The reproduced video signal DSv is written in and read from the memories 132 and 134 alternately every 2H. An object to provide the buffer memory means 130 is that the line sequence display mode is accomplished when monitoring the initial scene, and it will be described in detail.

The digital video signal DSv from the buffer memory means 130 is applied to the memories 62 and 64 via the selective switches 56 and 58. The reproduced digital video signal DSv is written in response to the writing clock WCK (=2 fs) synchronized with the bit clock BCK, and it is read in response to the reading clock RCK (=3 fsc) having relation to the subcarrier.

This embodiment is constructed as described, and the other portion is the same as FIGS. 1A–B. The operation of this embodiment is the same as that of FIGS. 1A–B except the line sequence display which will be discussed hereinafter.

Figure 23:
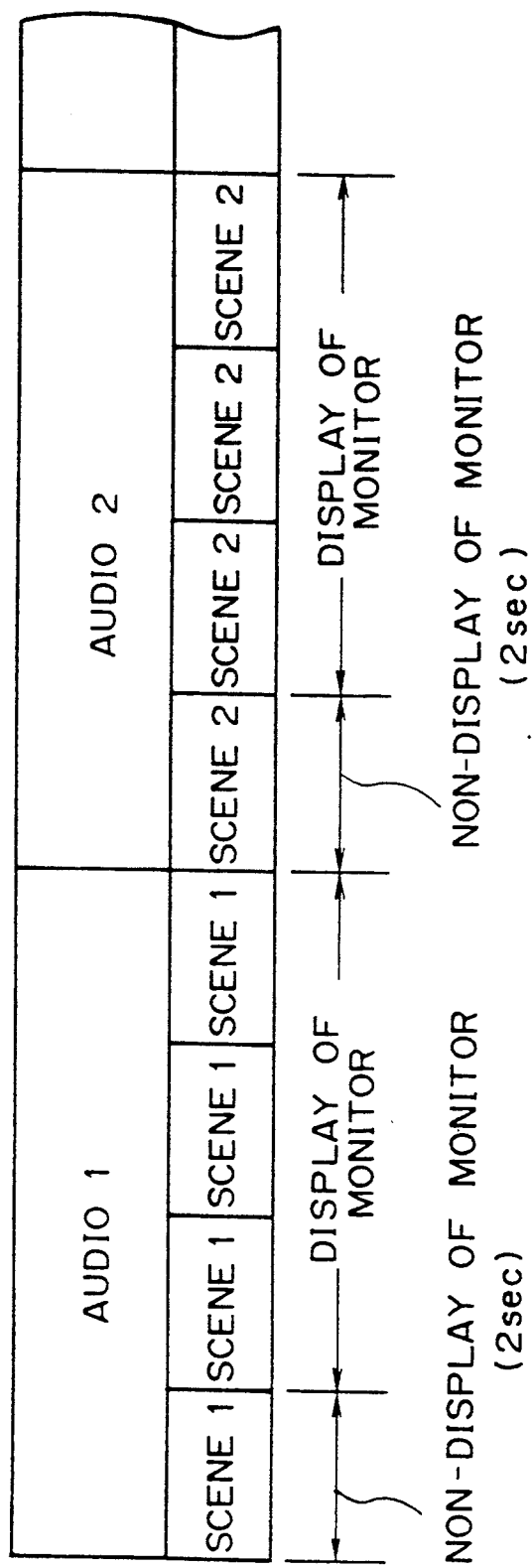

As discussed hereinbefore, it takes about two seconds to store the video signal of one scene in the memory means 60. In a case that the digital signal DS is reproduced where the same scene is inserted to the single audio signal (e.g., audio 1) many times as shown in FIG. 23, no image is displayed on the monitor until the video signal of the first scene (scene 1) is stored in the memory means 60. After all the video signal of one field for the first scene 1 is stored, this scene may be monitored. After that, the same video signal is used repeatedly. Thus, the monitor is displayed as shown in FIG. 23.

However, it is desirable to monitor the first scene 1 in synchronism with the reproducing operation of the audio signal. It takes at least about two seconds to store the video signal of one scene in the memory means 60, because the audio sampling clock fs is used as the writing clock.

Figure 24:
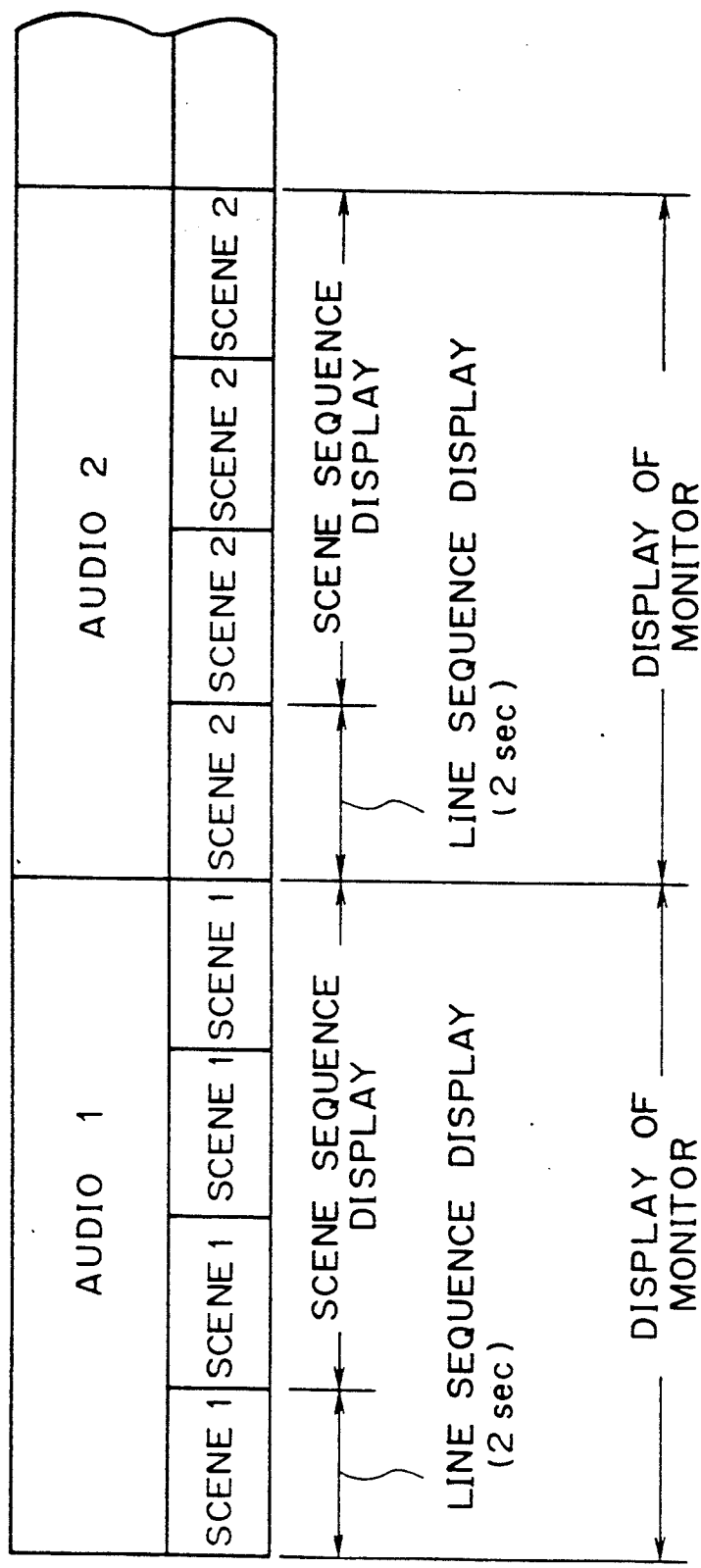

For improving this disadvantage, the first scene is displayed on the monitor in the line sequence manner as shown in FIG. 24. Thus, the first scene can be monitored in synchronism with the audio signal. The line sequence display mode is applied only to the period while the first scene is stored in the memory means 60, and the stored video signal is used later for the scene sequence display.

Figure 25:
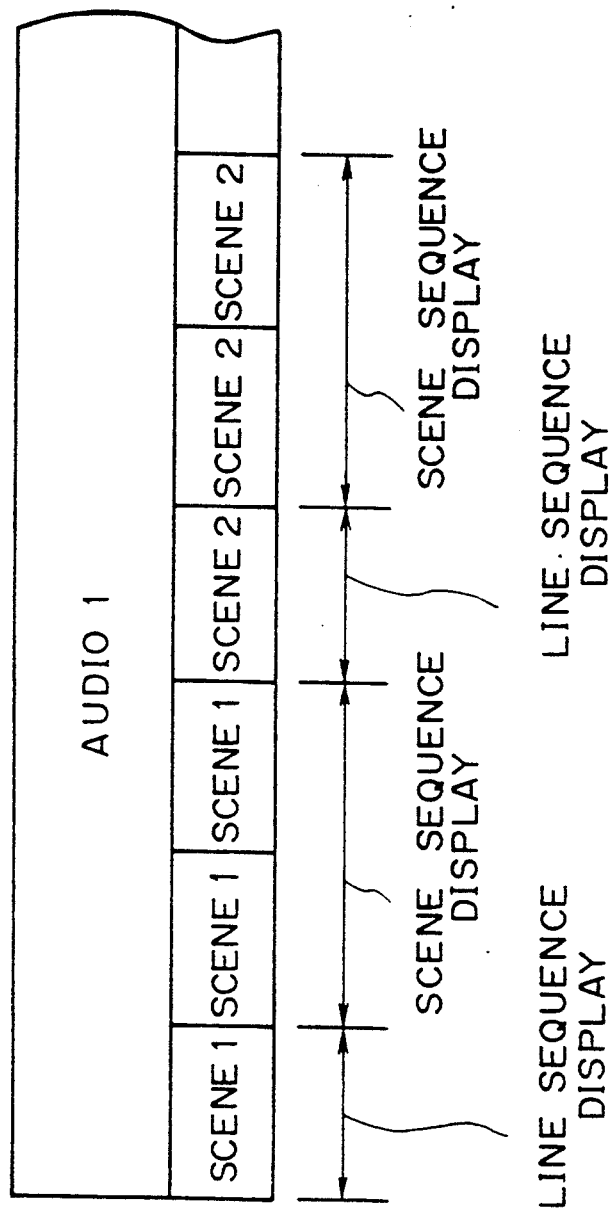

The line sequence display mode is applied when the contents of the scene are changed. If a plurality of scenes are inserted into a single audio, the monitor display is done as shown in FIG. 25.

For accomplishing the above discussed operation, the buffer memory means 130 are provided as shown in FIGS. 22A–B. The reproduced digital video signal DSv is written in the pair of line memories 132 and 134 alternately as shown in FIGS. 26A and 26B in response to the audio sampling clock fs. The stored video signal is read alternately from the line memories 132 and 134 in response to the video sampling clock 3 fsc. The reading timing is synchronized with the vertical blanking pulse VBLK (FIG. 26C). In this embodiment, the readout operation is done in synchronism with the vertical blanking pulse VBLK obtained just after the writing operation.

After that, the memory 62 (or 64) writes the data again. Thus, the video signal is written in the memory 62 every 2H in sequence by using the video sampling clock 3 fsc. After completing the writing operation, the readout mode is applied. While the next 2H video signal is written again, all the written video signal is read by using the video sampling clock 3 fsc. This read video signal is monitored (FIGS. 26D through 26F).

Therefore, the first 2H video signal is read and monitored. In the next reading mode, the first rewritten 2H video signal and the previously rewritten 2H video signal signal are read simultaneously. As a result, the monitor display is increased by 2H as shown in FIG. 26F, so that the line sequence display is accomplished.

After the last 2H video signal (260th through 262nd) is rewritten, one scene is completed as shown in FIG. 26F. After that, the same video signal is used to be monitored. The line sequence display is done only for the initial two seconds, and the scene sequence display is done later (see FIG. 24). Thus, the inserted scene can be monitored in substantial synchronism with the audio signal.

When a plurality of scenes are inserted, the first scene of every different scene or picture is displayed in the line sequence manner. If the mode code of the identification code includes information whether the inserted scene is the same or different, the scene condition can be determined easily. Moreover, the determination output controls the memory mode of the memory means 60.

It will be obvious to those having ordinary skill in the art that many changes may be made in the above described details of the preferred embodiments of the present invention without departing from the spirit and scope of the present invention. For example, the post-recording process is only for postrecording the audio signal in the discussed embodiment, however, the video signal may be postrecorded, or a desired one of the audio and video signals may be postrecorded. The embodiments were discussed in the condition that $T=16$, $N=10$ and $M=6$, however, the values N and M are not limited to these values. Therefore, the scope of the present invention should be determined only by the following claims.

What is claimed is:

1. A method of recording a digital audio signal and a digital video signal, comprising the steps of:

forming a composite digital signal having bits $1 \ldots (N+M)$ (N,M: positive integers) from a digital audio signal component having bits $1 \ldots N$, where bit 1 is the LSB and bit N is the MSB, and a digital video signal component having bits $1 \ldots M$, where bit 1 is the LSB and bit M is the MSB, wherein bits $1 \ldots M$ of the composite digital signal are bits $M \ldots 1$ respectively of the digital video signal component and bits $(M+1) \ldots (M+N)$ of the composite digital signal are bits $1 \ldots N$ respectively of the digital audio signal component; and recording the composite digital signal in a recording medium.

2. The method according to claim 1, wherein the composite digital signal is recorded on a magnetic tape by a rotary magnetic head.

3. The method according to claim 1 further comprising inverting the kth bit (k: a positive integer no greater than M) of the digital video signal component prior to said forming step.

4. A recording apparatus for a digital audio signal and a digital video signal, comprising:

mixing means for receiving a digital audio signal component having bits $1 \ldots N$, where bit 1 is the LSB and bit N is the MSB, and a digital video signal component having bits $1 \ldots M$, where bit 1 is the LSB and bit M is the MSB (N,M: positive integers) and forming a composite digital signal having bits $1 \ldots (N+M)$ by mixing the digital audio signal component and the digital video signal component, wherein bits $1 \ldots M$ of the composite digital signal are bits $M \ldots 1$ respectively of the digital video signal component and bits $(M+1) \ldots (M+N)$ of the composite digital signal are bits $1 \ldots N$ respectively of the digital audio signal component; and recording means for recording the composite digital signal from said mixing means on a recording medium.

5. A recording apparatus according to claim 4, wherein said recording means includes a rotary magnetic head so as to record the composite digital signal on a magnetic tape.

6. A recording apparatus according to claim 4 further comprising bit inverting means for inverting the kth bit (k: a positive integer no greater than M) of the digital video signal component prior to said mixing means receiving the digital video signal component.

7. A recording apparatus according to claim 4, comprising:

a first analog-to-digital converter for converting an analog audio signal into the digital audio signal component in response to a first sampling clock;

a second analog-to-digital converter for converting an analog video signal into the digital video signal component in response to a second sampling clock; and timing conversion means for converting timing of the digital video signal component from said second analog-to-digital converter such that the timing conversion means provides a digital video signal component that is synchronized with the first sampling clock;

and wherein the mixing means receive the digital audio signal component from the first analog-to-digital converter and the digital video signal component from said timing conversion means.

8. A reproducing apparatus for a digital audio signal and a digital video signal, comprising:

reproducing means for reproducing a composite digital signal having bits $1 \ldots (N+M)$ (N,M: positive integers) from a recording medium; and separation means for separating the composite digital signal into a digital audio signal component having bits $1 \ldots N$, where bit 1 is the LSB and bit N is the MSB and a digital video signal component having bits $1 \ldots M$, where bit 1 is the LSB and bit M is the MSB, said separation means also for reordering the bits of the digital video signal component, where bits $1 \ldots M$ of the composite digital signal are bits $M \ldots 1$ respectively of the digital video signal component and bits $(M+1) \ldots (M+N)$ of the composite digital signal are bits $1 \ldots N$ respectively of the digital audio signal component.

9. A reproducing apparatus according to claim 8, further comprising audio output means connected to receive the digital audio signal component and generate an acoustic signal in response thereto.

10. A reproducing apparatus according to claim 8, further comprising video output means connected to receive the digital video signal component and generate a visual signal in response thereto.

11. A reproducing apparatus according to claim 8, further comprising:

a character generator for generating a video signal of an image to be superimposed; and means for inserting the video signal from said character generator into the digital video signal component from said separation means;

whereby a predetermined image can be superimposed on the image represented by the digital video signal component.

12. A reproducing apparatus according to claim 8, wherein said reproducing means includes a rotary magnetic head so as to reproduce the composite digital signal from a magnetic tape.

13. A recording and reproducing apparatus for a digital audio signal and a digital video signal, comprising:

first bit inverting means for receiving an M-bit digital video input signal (M: positive integer) and providing an M-bit digital video output signal that is the same as the M-bit digital video input signal except that the kth bit (k: a positive integer no greater than M) of the M-bit digital video output signal is of the opposite state from the kth bit of the M-bit digital video input signal;

mixing means for forming an (N+M)-bit recording digital signal (N: positive integer) by mixing an N-bit digital audio signal as upper bits and the M-bit digital video output signal from said first bit inverting means as lower bits;

recording means for recording said (N+M)-bit digital signal produced from said mixing means on a recording medium;

reproducing means for reproducing said (N+M)-bit digital signal from said recording medium;

separation means for receiving the (N+M)-bit digital signal produced from said reproducing means and separating the N-bit digital audio signal and the M-bit digital video output signal from the (N+M)-bit digital signal; and second bit inverting means for receiving the M-bit digital video output signal from the separation means and inverting again the kth bit to reproduce the input video signal.

14. A recording and reproducing apparatus according to claim 13, further comprising a display device for displaying the reproduced input video signal.

15. A method of reproducing a digital audio signal and a digital video signal, comprising the steps of:

reproducing a composite digital signal having bits 1 . . . (N+M) (N,M: positive integers) from a recording medium; and separating the composite digital signal into a digital audio signal component having bits 1 . . . N, where bit 1 is the LSB and bit N is the MSB, and a digital video signal component having bits 1 . . . M, where bit 1 is the LSB and bit M is the MSB, said separating including reordering the bits of the digital video signal component, where bits 1 . . . M of the composite digital signal are bits M . . . 1 respectively of the digital video signal component and bits (M+1) . . . (M+N) of the composite digital signal are bits 1 . . . N respectively of the digital audio signal component.

16. The method according to claim 15, further comprising displaying the digital video signal component on a display device after said separating step.

17. The method according to claim 15, further comprising supplying the digital audio signal component to an audio output means to generate an acoustic signal.

18. The method according to claim 15, wherein the composite digital signal is reproduced from a magnetic tape by a rotary magnetic head.

19. A method of recording and reproducing a digital audio signal and a digital video signal, comprising the steps of:

(a) receiving a digital audio signal component having bits 1 . . . N, where bit 1 is the LSB and bit N is the MSB (N: positive integer) from a digital audio signal source, (b) receiving a digital video signal component having bits 1 . . . M, where bit 1 is the LSB and bit M is the MSB (M: positive integer) from a digital video signal source, (c) forming a composite digital signal having bits 1 . . . (N+M), wherein bits 1 . . . M of the composite digital signals are bits M . . . 1 respectively of the digital video signal component and bits (M+1) . . . (M+N) of the composite digital signal are bits 1 . . . N respectively of the digital audio signal component, (d) recording the composite digital signal in a recording medium, (e) subsequently reproducing the composite digital signal from the recording medium, (f) separating the digital audio signal component and the digital video signal component from the composite digital signal reproduced from the recording medium, and (g) employing the digital audio signal component to generate an audible sound and the digital video signal component to generate a visible image.

20. A method of recording and reproducing a digital audio signal and a digital video signal, comprising the steps of:

(a) receiving an N-bit digital audio signal component (N: positive integer) from a digital audio signal source, (b) receiving an M-bit digital video input signal component (M: positive integer) from a digital video signal source, (c) inverting the kth bit (k: a positive integer no greater than M) of the digital video input signal component to form an M-bit digital video output signal component, (d) forming a composite digital signal from the digital audio signal component and the digital video output signal component, (e) recording the composite digital signal in a recording medium, (f) subsequently reproducing the composite digital signal from the recording medium, (g) separating the digital audio signal component and the digital video output signal component from the composite digital signal reproduced from the recording medium, (h) inverting the kth bit of the digital video output signal component to produce an output digital video signal, and (i) employing the digital audio signal component to generate an audible sound and the output digital video signal to generate a visible image.

* * * * *